US 12,445,849 B2

(12) United States Patent
 Kim et al.

(10) Patent No.: US 12,445,849 B2
(45) Date of Patent: *Oct. 14, 2025

(54) APPARATUS, SYSTEM, AND METHOD FOR MONITORING NETWORK SECURITY AND PERFORMANCE

(71) Applicant: MAGDATA INC., Seoul (KR)

(72) Inventors: Jong Min Kim, Seoul (KR); Ho Jeong Hwang, Seongnam-si (KR); Seong Ki Shin, Seoul (KR)

(73) Assignee: MAGDATA INC., Seoul (KR)

( * ) Notice: Subject to any disclaimer, the term of this patent is extended or adjusted under 35 U.S.C. 154(b) by 129 days.

This patent is subject to a terminal disclaimer.

(21) Appl. No.: 17/927,680

(22) PCT Filed: Mar. 15, 2022

(86) PCT No.: PCT/KR2022/003626
§ 371 (c)(1),
(2) Date: Nov. 23, 2022

(87) PCT Pub. No.: WO2022/197073
PCT Pub. Date: Sep. 22, 2022

(65) Prior Publication Data
US 2023/0180005 A1    Jun. 8, 2023

(30) Foreign Application Priority Data

Mar. 17, 2021 (KR) .................. 10-2021-0034741
Mar. 10, 2022 (KR) .................. 10-2022-0029974

(51) Int. Cl.
*H04W 12/121*   (2021.01)
*H04L 9/40*   (2022.01)
(Continued)

(52) U.S. Cl.
CPC ........... *H04W 12/121* (2021.01); *H04L 43/12* (2013.01); *H04W 12/033* (2021.01)

(58) Field of Classification Search
None
See application file for complete search history.

(56) References Cited

U.S. PATENT DOCUMENTS

2014/0280889 A1  9/2014  Nispel et al.
2018/0220327 A1  8/2018  Karampatsis et al.
(Continued)

FOREIGN PATENT DOCUMENTS

CN    104601570 A    5/2015
KR  10-2013-0024388 A  3/2013
(Continued)

*Primary Examiner* — San Htun
(74) *Attorney, Agent, or Firm* — Invenstone patent LLC

(57) ABSTRACT

One aspect of the present invention discloses a method by which a network security monitoring apparatus monitors a 5G network. The method by which a network monitoring apparatus monitors a 5G network, according to one aspect of the present invention, comprises the steps of: mirroring and receiving a packet transmitted from a user terminal to a 5G core network and transmitted to a common network through at least one security module; and calculating an index related to network performance by monitoring the mirrored packet, wherein the at least one security module is located between a user plane function (UPF)-related module of the 5G core network and the common network and performs a security-related operation on data from the user terminal, and the network monitoring apparatus is located between the UPF-related module of the 5G core network and the common network and calculates the index related to the network performance according to mirroring of the packet transmitted through the at least one security module.

15 Claims, 31 Drawing Sheets

(51) Int. Cl.
*H04L 43/12* (2022.01)
*H04W 12/033* (2021.01)

(56) References Cited

U.S. PATENT DOCUMENTS

2020/0128399 A1* 4/2020 Verma .................. H04W 12/73
2020/0389835 A1* 12/2020 Talebi Fard .......... H04W 48/04
2022/0060893 A1* 2/2022 Gundavelli ............. H04L 63/08
2022/0201482 A1* 6/2022 Ferdi ..................... H04L 9/3236
2023/0057968 A1* 2/2023 Sharma ................. H04L 63/164

FOREIGN PATENT DOCUMENTS

KR 10-2015-0045016 A 4/2015
KR 10-2163279 B1 10/2020

* cited by examiner

APPARATUS, SYSTEM, AND METHOD FOR MONITORING NETWORK SECURITY AND PERFORMANCE

CROSS-REFERENCE TO RELATED APPLICATIONS

This application is a National Stage filing under 35 U.S.C. 371 of International Application No. PCT/KR2022/003626, filed on Mar. 15, 2022, which claims the benefit of earlier filing date and right of priority to Korean Application No. 10-2021-0034741, filed on Mar. 17, 2021, and Korean Application No. 10-2022-0029974, filed on Mar. 10, 2022 in the Korean Intellectual Property Office, the contents of which are all hereby incorporated by reference herein in their entirety.

BACKGROUND

Field of the Invention

The present disclosure relates to an apparatus, system, and method for monitoring network security and performance.

Related Art

A network generally includes a communication link and various devices with communication capability connected to the communication link. The devices include computers, peripheral devices, routers, storage devices, and appliances with processors and communication interfaces. Here, the term "device" typically includes logical devices or other units having functionality and an ability to exchange data, and can include not only all home devices but also general purpose computers.

Traditional network systems include a client device used by a user and various server devices associated with a web site. The client device, in general, makes a connection request to a server with a specific IP address and accesses it after a standby time. At this time, if multiple client devices of multiple users access the server all at a particular point in time, the performance of a network service associated with the server may be degraded due to a bottleneck. When there is an issue with service performance or quality, the user may experience longer latency due to a delay and the rate of service use by the user will decrease, which leads to decreased productivity and sales. Moreover, the cost of IT operations will increase, and the server administrator and/or the owners of related businesses may end up with poor outcomes, that is, a decline in company competitiveness.

In particular, devices in a 5G communication network operate on the assumption that, in the 5G communication network, communication between devices takes place within the bounds of performance. Thus, it is very important to quickly find out how fast communication between devices is taking place, and, if the communication does not flow smoothly, what the cause of the performance degradation is. However, this problem is not being dealt with properly because there is no proper service for finding the exact cause of such performance degradation. As a result, the issue of performance degradation is not handled properly, and performance improvements cannot be achieved at the right timing, thereby causing difficulties in overall system operation.

Therefore, it is necessary to quickly find the cause of performance degradation and deal with this as soon as possible.

FIG. 1 is a conceptual diagram for explaining a conventional process for performing network service management.

Referring to FIG. 1, an IT team manager gives instructions related to quality management to a network operation part, a server operation part, a database development part, and an application development part.

When there is a particular service issue, the person in charge of each part individually assess any problems with IT devices they manage and reports about them. That is, they are not able to quickly identify the cause of a problem and properly deal with performance degradation issues because they see a problem with a particular service as something separate from other things, as they put it "No problem with the application", "No problem with the network" and/or "nothing wrong with the server". That is, service improvements cannot be achieved at the right timing.

Meanwhile, the development of Internet of Things (IoT) makes a lot of changes to traditional network structures. As a large number of devices using IoT participate in a network, the number of client terminals connected to one server increases definitely at an exponential rate, and it is getting more and more difficult to diagnose the overall network including the respective devices. Furthermore, when there arises a security problem with one of these IoT devices, it may pose a threat to the overall network. However, the IoT devices are more vulnerable to security problems compared to components of conventional networks.

SUMMARY

A technical aspect of the present disclosure is to provide an apparatus, system, and method for monitoring network security and performance.

One aspect of the present disclosure provides a method by which a network security monitoring server apparatus monitors the security of a 5G non-public (NP) network, the method including: mirroring and receiving a packet transmitted from a user terminal or to the user terminal through the 5G non-public network; receiving a monitoring result of the state of the user terminal from a security monitoring terminal apparatus connected to the user terminal; and calculating an indicator related to network performance based on at least one of the mirrored packet and the monitoring result, wherein the packet is a packet of which IP encryption is decrypted, the monitoring result is received based on an IP designated for the monitoring server apparatus, and the monitoring server apparatus is located between a user plane function (UPF) relay module of the 5G non-public network and a public network and calculates the indicator related to network performance by mirroring a packet sent or received through the UPF relay module.

At least one monitoring server apparatus may exist within the 5G non-public network, the monitoring server apparatus may be connected to at least one of a multi-access edge computing (MEC) module and a switching device that delivers a packet to the public network from the UPF relay module of the 5G non-public network, and the monitoring terminal apparatus may be configured to transmit the monitoring result based on either any one IP designated for the at least one monitoring server apparatus, an IP designated for public use by the at least one monitoring server apparatus, or a broadcasting IP for public use the at least one monitoring server apparatus uses to receive a packet.

A plurality of monitoring server apparatuses may exist within the 5G non-public network, and each of the plurality of monitoring server apparatuses may be configured to exchange the monitoring result with one another based on the IP designated for each apparatus.

The method may further include, upon discovering an abnormal operation from the indicator related to network performance, sending alerting information to a security controller apparatus by the monitoring server apparatus.

The monitoring terminal apparatus may include a function of collecting packets of the user terminal and sensing a network security threat related to the user terminal, wherein, upon sensing the network security threat, the monitoring terminal apparatus notifies at least either the monitoring server apparatus or the user terminal.

The method monitoring server apparatus may be configured to sense a stoppage of operation and incorporate the same into the indicator related to network performance, if the monitoring terminal apparatus stops operating.

One aspect of the present disclosure provides a network security monitoring system that monitors the security of a 5G non-public (NP) network, the network security monitoring system including: a packet mirroring apparatus which mirrors a packet transmitted from a user terminal or to the user terminal through the 5G non-public network; a security monitoring terminal apparatus which is connected to the user terminal and monitors the state of the user terminal; and a network security monitoring server apparatus which receives the monitoring result from the monitoring terminal apparatus, receives the mirrored packet from the packet mirroring apparatus, and calculates an indicator related to network performance based on at least one of the mirrored packet and the monitoring result, wherein the packet is a packet of which IP encryption is decrypted, the monitoring result is received based on an IP designated for the monitoring server apparatus, and the packet mirroring apparatus is located between a user plane function (UPF) relay module of the 5G non-public network and a public network and mirrors a packet sent or received through the UPF relay module.

At least one monitoring server apparatus may exist within the 5G non-public network, the monitoring server apparatus may be connected to at least one of a multi-access edge computing (MEC) module and a switching device that delivers a packet to the public network from the UPF relay module of the 5G non-public network, and the monitoring terminal apparatus may be configured to transmit the monitoring result based on either any one IP designated for the at least one monitoring server apparatus, an IP designated for public use by the at least one monitoring server apparatus, or a broadcasting IP for public use the at least one monitoring server apparatus uses to receive a packet.

A plurality of monitoring server apparatuses may exist within the 5G non-public network, and each of the plurality of monitoring server apparatuses may be configured to exchange the monitoring result with one another based on the IP designated for each apparatus.

The system may further include a security controller apparatus, wherein, upon discovering an abnormal operation from the indicator related to network performance, the monitoring server apparatus sends alerting information to a security controller apparatus, and the security controller apparatus performs an operation of stopping the network or restarting the same.

The monitoring terminal apparatus may include a function of collecting packets of the user terminal and sensing a network security threat related to the user terminal, wherein, upon sensing the network security threat, the monitoring terminal apparatus notifies at least one of the monitoring server apparatus or the user terminal.

The system monitoring server apparatus may be configured to sense a stoppage of operation and incorporate the same into the indicator related to network performance, if the monitoring terminal apparatus stops operating.

One aspect of the present disclosure provides a network security monitoring server apparatus that monitors the security of a 5G non-public (NP) network, the network security monitoring server apparatus including: a processor configured to mirror and receive a packet transmitted from a user terminal or to the user terminal through the 5G non-public network, to receive a monitoring result of the state of the user terminal from a security monitoring terminal apparatus connected to the user terminal, and to calculate an indicator related to network performance based on at least one of the mirrored packet and the monitoring result; and a memory storing instructions and programs required for operation of the processor, wherein the packet is a packet of which IP encryption is decrypted, the monitoring result is received based on an IP designated for the monitoring server apparatus, and the mirrored packet is a packet transmitted or received through the UPF relay module, that is mirrored between a user plane function (UPF) relay module of the 5G non-public network and a public network.

A plurality of monitoring server apparatuses may exist within the 5G non-public network, and each of the plurality of monitoring server apparatuses may be configured to exchange the monitoring result with one another based on the IP designated for each apparatus.

The monitoring server apparatus may be configured to send alerting information to a security controller upon discovering an abnormal operation from the indicator related to network performance.

One aspect of the present disclosure provides a security monitoring terminal apparatus connected to a user terminal in order to monitor the security of a 5G non-public (NP) network, the security monitoring terminal apparatus including: a processor configured to collect a packet transmitted from or to the user terminal, monitor the state of the user terminal, and send the monitoring result to a network security monitoring server apparatus; and a memory storing instructions and programs required for operation of the processor, wherein the packet is a packet of which IP is decrypted, and the monitoring result is transmitted based on an IP designated for the monitoring server apparatus The processor may be configured to collect packets of the user terminal and sense a network security threat related to the user terminal, and, upon sensing the network security threat, to notify at least either the monitoring server apparatus or the user terminal of the security threat.

DESCRIPTION OF EXEMPLARY EMBODIMENTS

Figure 1:
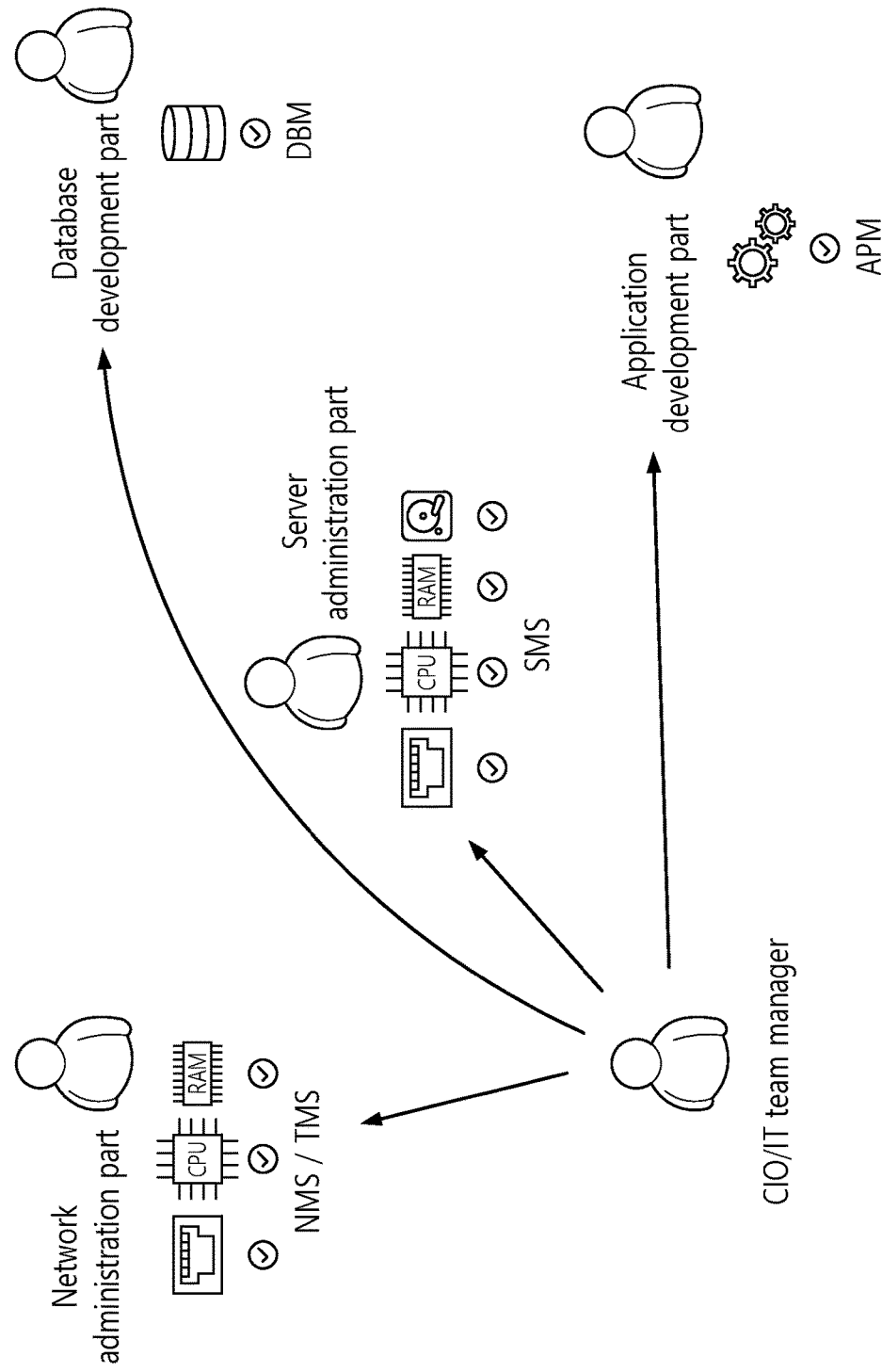
FIG. 1 is a conceptual diagram for explaining a conventional process for performing network service management.

The present disclosure may be subjected to many changes and have several forms, and specific embodiments thereof are illustrated in the drawings and described in detail in the specification.

However, it will be understood that the present disclosure is not intended to be limited to the specific forms set forth herein, and all changes, equivalents, and substitutions included in the technical scope and spirit of the present disclosure are included.

Terms such as first, second, and the like may be used to describe various components, but these components should not be limited by the terms. The terms are used only for the purpose of distinguishing one component from another component. For instance, a first component may be referred to as a second component, or similarly, a second component may be referred to as a first component, without departing from the scope of the present disclosure.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Terms used in the present specification are used only in order to describe specific exemplary embodiments rather than limiting the present disclosure. Singular forms are intended to include plural forms unless the context clearly indicates otherwise. It will be further understood that the terms "comprises" or "have" used in this specification, specify the presence of stated features, steps, numerals, operations, components, parts, or a combination thereof, but do not preclude the presence or addition of one or more other features, numerals, steps, operations, components, parts, or a combination thereof.

Unless indicated otherwise, it is to be understood that all the terms used in the specification including technical and scientific terms have the same meaning as those that are understood by those who skilled in the art. It must be understood that the terms defined by the dictionary are identical with the meanings within the context of the related art, and they should not be ideally or excessively formally defined unless the context clearly dictates otherwise.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication. In addition, a communication system design considering a service/UE sensitive to reliability and latency is being discussed. The introduction of next-generation RAT, which takes into account such enhanced mobile broadband communication, massive MTC (mMCT), and ultra-reliable and low latency communication (URLLC), is being discussed. In the present disclosure, for simplicity, this technology will be referred to as new RAT, NR (NEW RADIO), or 5G communication.

In particular, devices in a 5G communication network operate on the assumption that, in the 5G communication network, communication between devices takes place within the bounds of performance. Thus, it is very important to quickly find out how fast communication between devices is taking place, and, if the communication does not flow smoothly, what the cause of the performance degradation is. However, this problem is not being dealt with properly because there is no proper service for finding the exact cause of such performance degradation. As a result, the issue of performance degradation is not handled properly, and performance improvements cannot be achieved at the right timing, thereby causing difficulties in overall system operation.

Throughout the specification, an entity includes various kinds of devices associated with a network, which is a term that includes a user terminal (also referred to as "client terminal") and/or a server device. In an IoT environment, the user terminal may be called an IoT device.

A user basically means a user of a user terminal. In some cases, however, the user may mean a user of a network monitoring apparatus according to an embodiment of the present disclosure. A network administrator and/or a network manager is a person who manages a network related to the network monitoring apparatus, which may mean the user of the network monitoring apparatus. Hereinafter, the network monitoring apparatus is an apparatus that calculates security and performance-related indicators of a network, which also may be called a packet mirroring apparatus, a data traffic analyzer, a network performance monitoring apparatus, or a network security monitoring apparatus. Also, the network monitoring apparatus may be called a network monitoring visualization apparatus since it can be implemented as an apparatus that visualizes the security and performance-related indicators of a network service.

The network monitoring apparatus may be present as an independent apparatus or provided as one function implemented by another entity within the network. In this case, the network monitoring apparatus may be called a network monitoring function (hereinafter, "NMF"). Accordingly, an NMF that monitors packets coming into or out of the server may be called a network server monitoring function (NMSF), and an NMF that monitors the user terminal (or client terminal) may be called a network client monitoring function (NMCF).

Hereinafter, the term "network security and performance" may be collectively used in relation to the security and performance of communication in a server, a communication network, and a client.

LTE and 5G-Based Communication System

Figure 2:
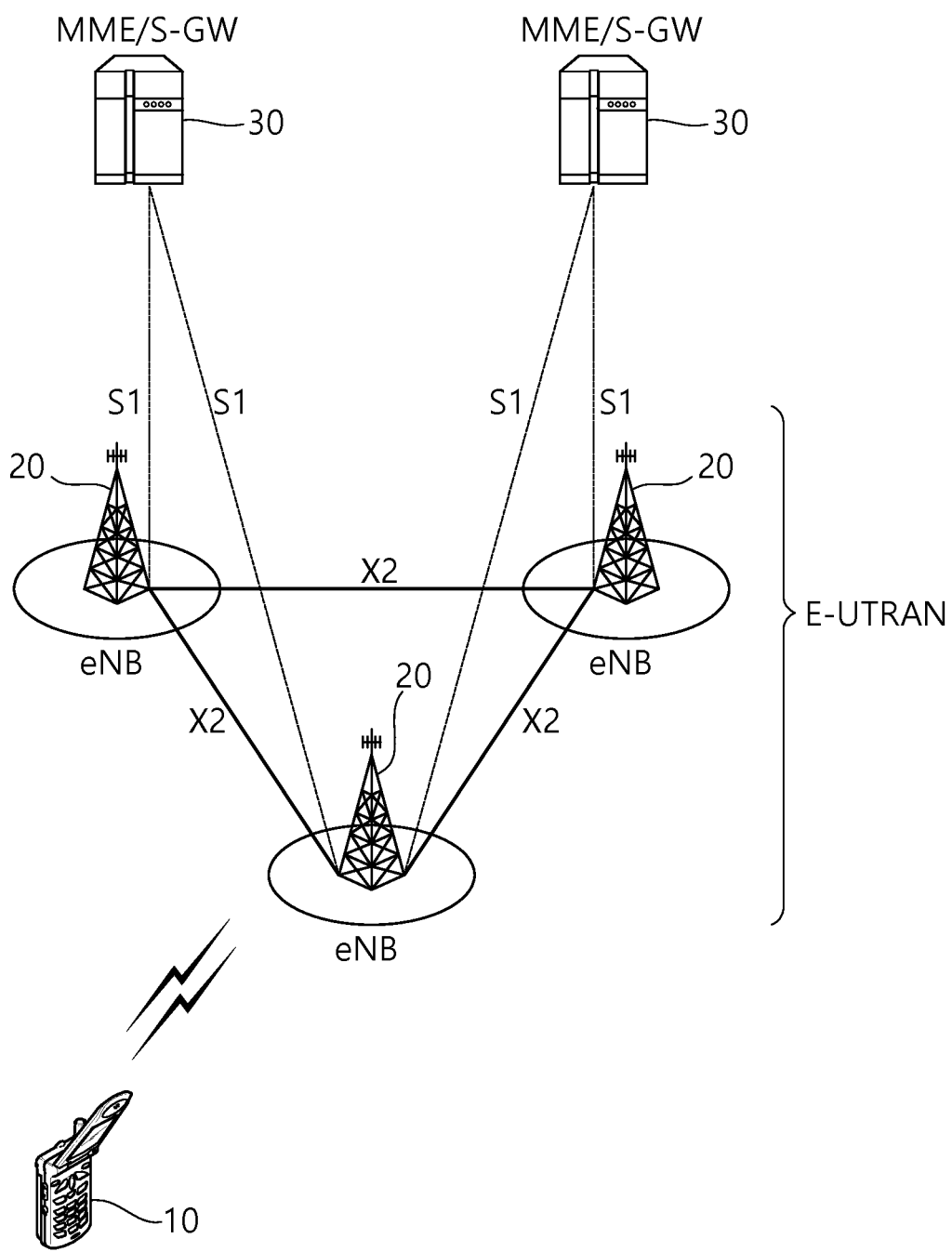
FIG. 2 is a conceptual diagram illustrating a wireless communication system to which the present disclosure may be applied.

FIG. 2 is a conceptual diagram illustrating a wireless communication system to which the present disclosure may be applied. It also may be referred to as E-UTRAN (Evolved-UMTS Terrestrial Radio Access Network) or an LTE (Long Term Evolution)/LTE-A system.

E-UTRAN includes a base station (BS) 20 which provides a control plane and a user plane to a user equipment (UE) 10. The UE 10 may be fixed or mobile and also called a mobile station (MS), a user terminal (UT), a subscriber station (SS), a mobile terminal (MT), a wireless device, a station (STA), or the like. The base station 20 refers to a fixed station communicating with the UE 10 and may also be called an evolved-NodeB (eNB), a base transceiver system (BTS), an access point, or the like.

Base stations 20 may be connected to each other through an X2 interface. The base station 20 is connected to an evolved packet core (EPC) 30 through an S1 interface, more specifically, to a mobility management entity (MME) through S1-MME and to a serving gateway (S-GW) through S1-U.

The EPC 30 is composed of an MME, an S-GW, and a packet data network gateway (P-GW). The MME has access information of UEs or information related to UE capability, and such information is mainly used for UE mobility management. The S-GW is a gateway having E-UTRAN as an end point and the P-GW is a gateway having PDN as an end point.

Layers of a radio interface protocol between the UE and a network may be classified into an L1 (first layer), an L2 (second layer), and an L3 (third layer) based three lower layers of an open system interconnection (OSI) reference model which is widely known in a communication system and, among them, a physical layer that belongs to the first layer provides an information transfer service using a physical channel and a radio resource control (RRC) layer positioned on the third layer serves to control radio resources between the UE and the network. To this end, the RRC layer exchanges an RRC message between the UE and the base station.

Figure 3:
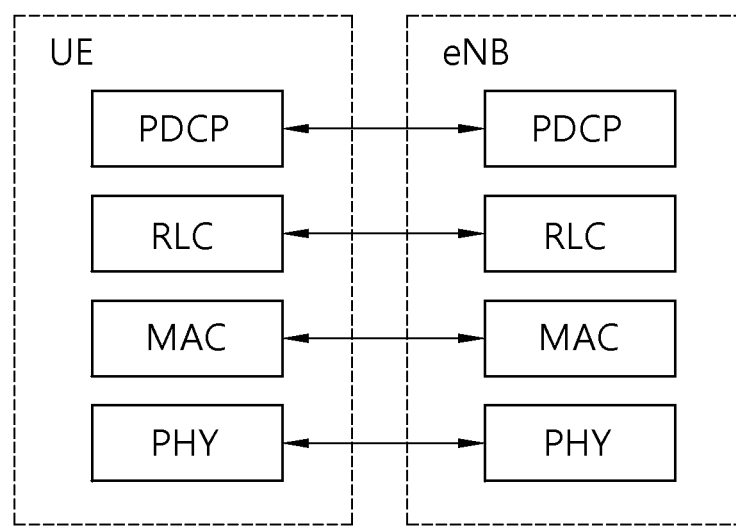
FIG. 3 is a diagram showing a radio protocol architecture for a user plane.
Figure 4:
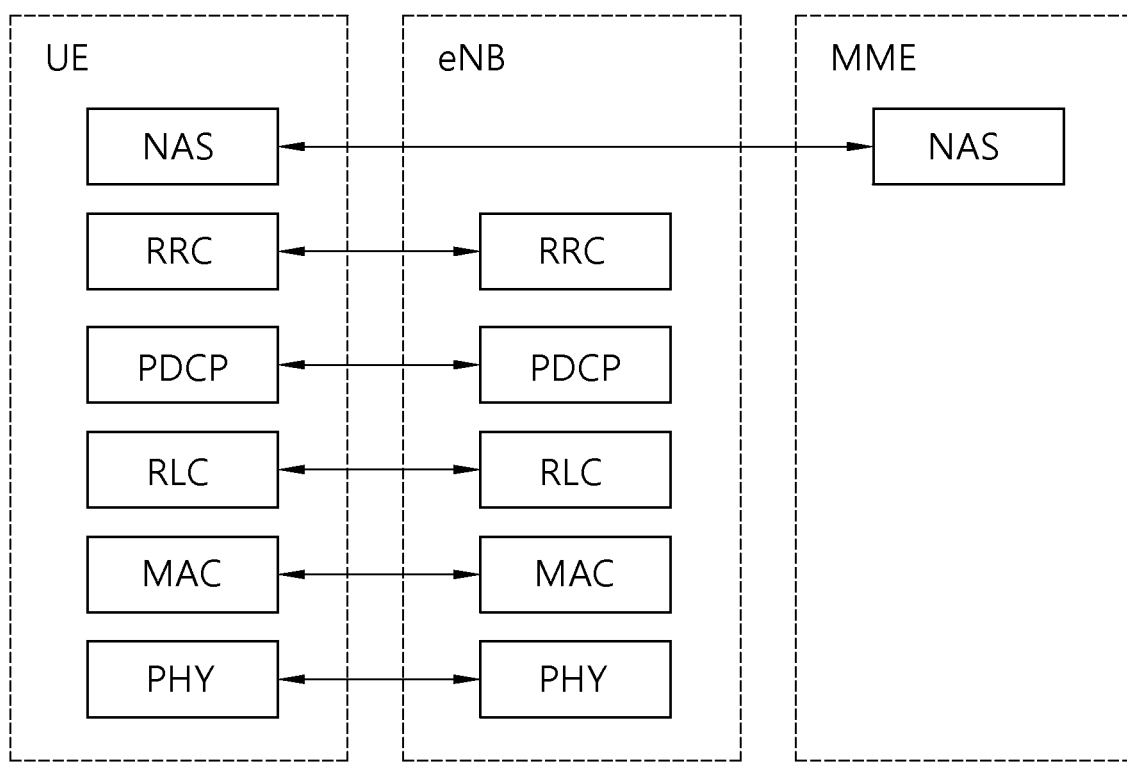
FIG. 4 is a diagram showing a radio protocol architecture for a control plane

FIG. 3 is a block diagram showing a radio protocol architecture for a user plane. FIG. 4 is a block diagram showing a radio protocol architecture for a control plane. The user plane is a protocol stack for user data transmission, and the control plane is a protocol stack for transmitting a control signal.

Referring to FIGS. 3 and 4, a physical (PHY) layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data is transferred through the physical channel. The physical channel is modulated using an orthogonal frequency division multiplexing (OFDM) scheme, and utilizes time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

A radio resource control (RRC) layer is defined only in the control plane. The RRC layer serves to control the logical channel, the transport channel, and the physical channel in relation to configuration, reconfiguration and release of radio bearers (RBs). An RB means a logical path provided by the first layer (i.e., the PHY layer) and the second layer (i.e., the MAC layer, the RLC layer, and the PDCP layer) for data delivery between the UE and the network.

Functions of a packet data convergence protocol (PDCP) layer in the user plane include user data delivery, header compression, and ciphering. Functions of the packet data convergence protocol (PDCP) layer in the control plane include control-plane data delivery and ciphering/integrity protection.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state, and otherwise the UE is in an RRC idle state.

Examples of a downlink transport channel through which data is transmitted from the network to the UE include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Examples of an uplink transport channel through which data is transmitted from the UE to the network include a random access channel (RACH) for transmitting an initial control message and an uplink shared channel (SCH) for transmitting user traffic or control messages.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. A resource block is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT or NR; also referred to as "5G") will be described.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication. In addition, a communication system design considering a service/UE sensitive to reliability and latency is being discussed. The introduction of next-generation RAT, which takes into account such enhanced mobile broadband communication, massive MTC (mMCT), and ultra-reliable and low latency communication (URLLC), is being discussed. In the present disclosure, for simplicity, this technology will be referred to as new RAT, NR (NEW RADIO), or 5G communication.

Figure 5:
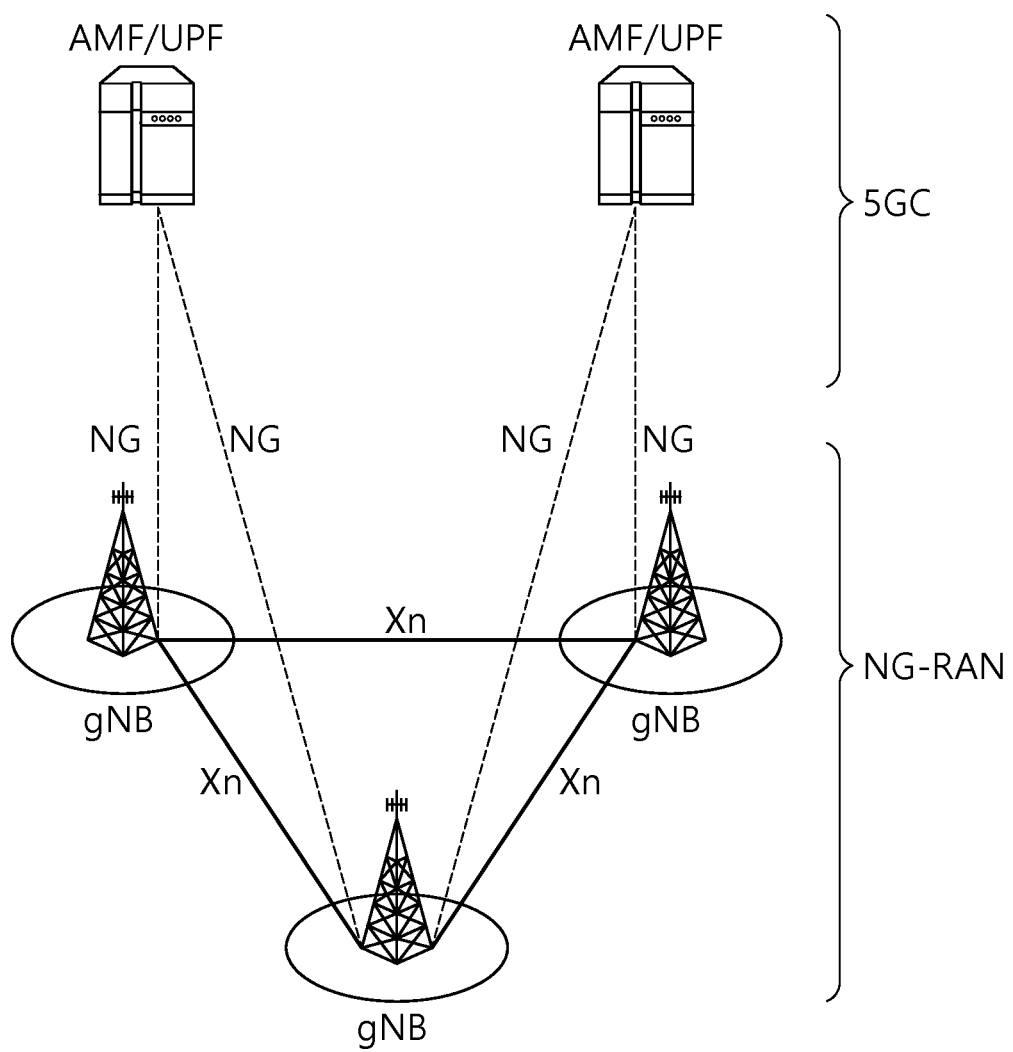
FIG. 5 is a conceptual diagram illustrating a system structure of a next generation radio access network (NG-RAN) to which NR is applied.

FIG. 5 illustrates a system structure of a new generation radio access network (NG-RAN) to which the NR is applied.

Referring to FIG. 5, the NG-RAN may include a gNB and/or an eNB providing user plane and control plane protocol terminations to a UE. FIG. 4 illustrates a case where only the gNB is included. The gNB and the eNB are connected to each other via an Xn interface. The gNB and eNB are connected to a 5G core network (5GC) via an NG interface. More specifically, the gNB and the eNB are connected to an access and mobility management functions (AMF) via an NG-C interface, and connected to a user plane function (UPF) via an NG-U interface.

Figure 6:
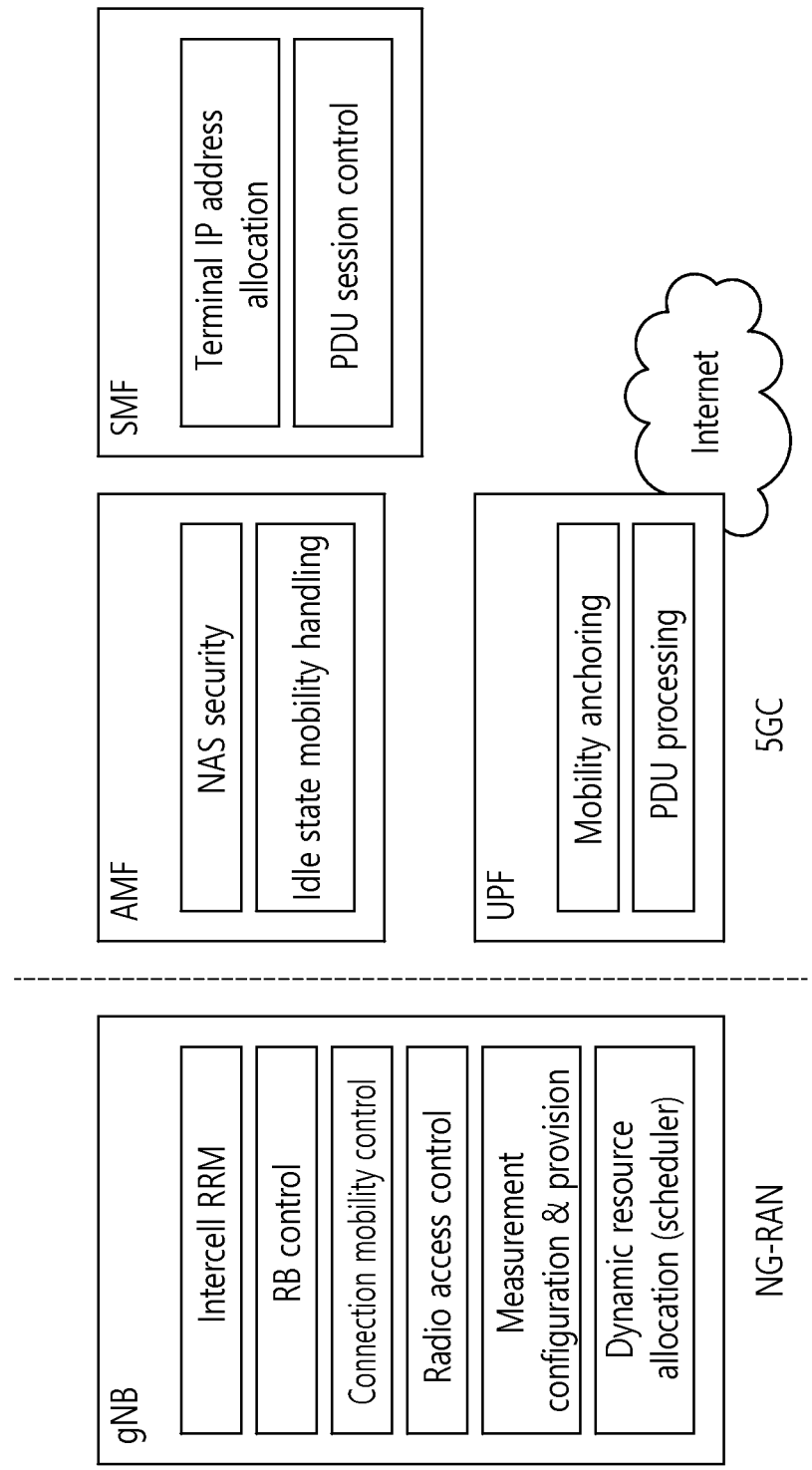
FIG. 6 is a block diagram illustrating functional split between NG-RAN and 5GC.

FIG. 6 illustrates functional split between NG-RAN and 5GC.

The gNB may provide functionality such as inter-cell radio resource management (RRM), radio bearer (RB) control, connection mobility control, radio access control, measurement configuration & provision, and dynamic resource allocation, and the like. The AMF may provide functionality such as non-access stratum (NAS) security and idle state mobility handling. The UPF may provide functionality such as mobility anchoring and protocol data unit (PDU) processing. A Session Management Function (SMF) may provide functions such as terminal IP address allocation and PDU session control.

Figure 7:
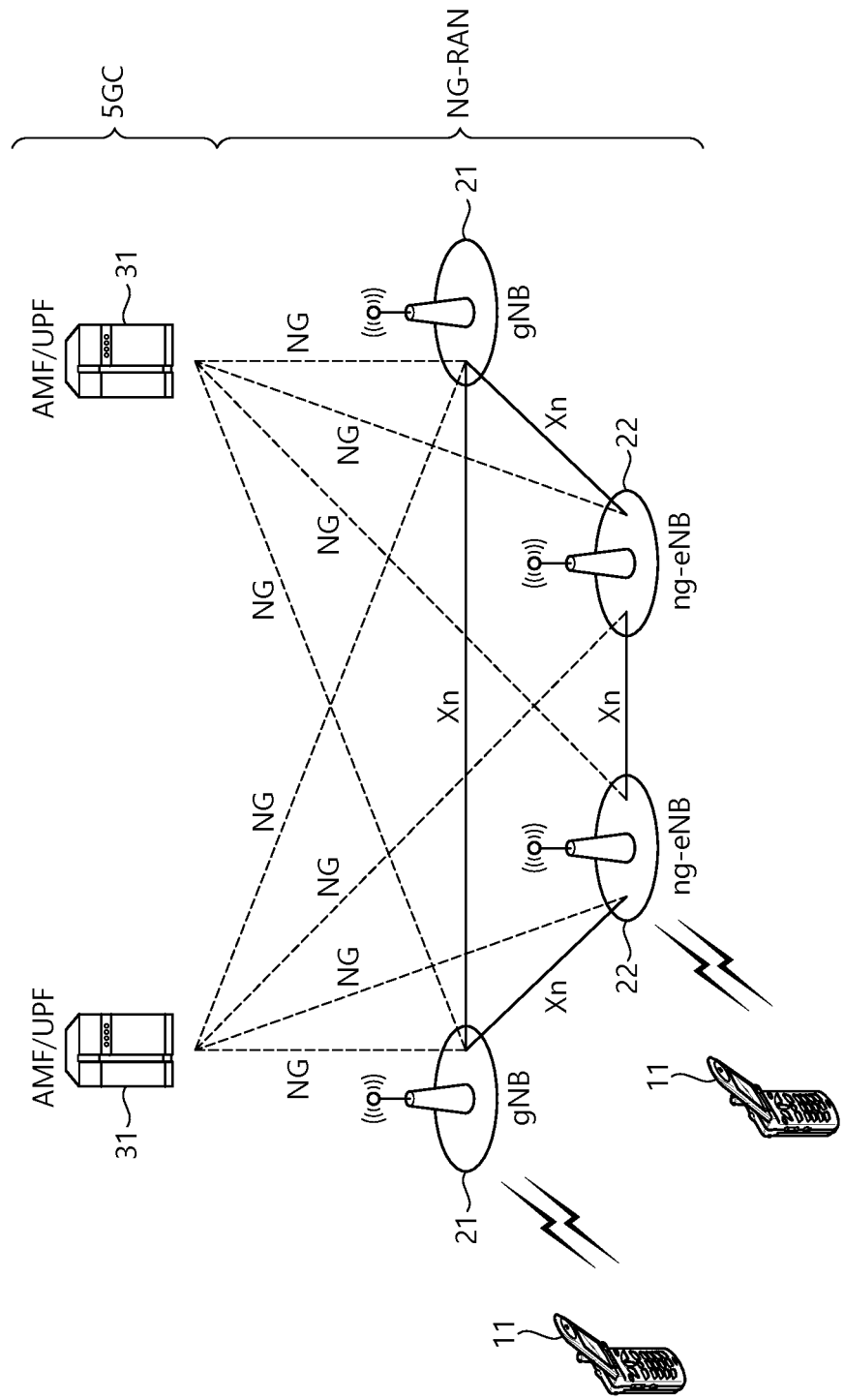
FIG. 7 is a view showing another example of a wireless communication system to which technical features of the present disclosure may be applied.

FIG. 7 shows another example of a wireless communication system to which technical features of the present disclosure may be applied. Specifically, FIG. 7 shows a system architecture based on a 5G new radio access technology (NR) system. The entity used in the 5G NR system (hereinafter, simply referred to as "NR") may absorb some or all of the functions of the entities introduced in FIG. 2 (e.g., eNB, MME, S-GW). The entity used in the NR system may be identified by the name "NG" for distinction from the LTE.

In the following description, for NR, 3GPP TS 38 series (3GPP TS 38.211, 38.212, 38.213, 38.214, 38.331, etc.) can be referred to in order to facilitate understanding of the following description.

Referring to FIG. 7, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 20 shown in FIG. 2. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts functions, such as NAS security, idle state mobility handling, etc. The AMF is an entity including the functions of the conventional MME. The UPF hosts functions, such as mobility anchoring, protocol data unit (PDU) handling. The UPF an entity including the functions of the conventional S-GW. The SMF hosts functions, such as UE IP address allocation, PDU session control.

The gNB and the ng-eNB are connected together via an Xn interface. The gNB and the ng-eNB are also connected via an NG interfaces to the 5GC, more specifically to the AMF via an NG-C interface and to the UPF via an NG-U interface.

Figure 8:
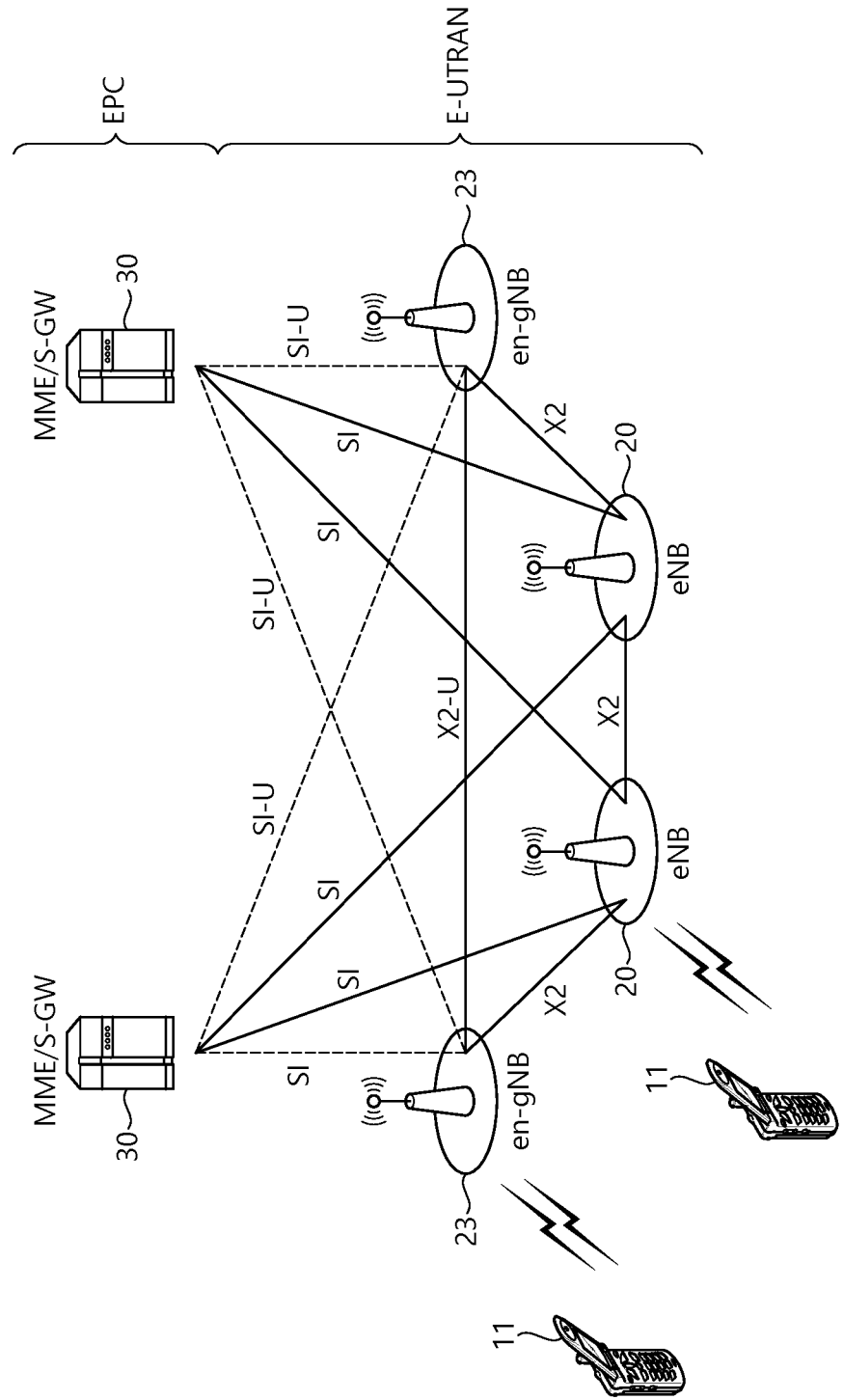
FIG. 8 is a view showing yet another example of a wireless communication system to which technical features of the present disclosure may be applied.

FIG. 8 shows yet another example of a wireless communication system to which technical features of the present disclosure may be applied. Specifically, FIG. 8 shows a system architecture based on an LTE system. The entity used in the NR may absorb some or all of the functions of the entities introduced in FIG. 5 (e.g., gNB, AMF, UPF). The entity used in the LTE system may be identified by the name "EN" for distinction from the NR.

Referring to FIG. 8, the wireless communication system includes one or more UE 11, an E-UTRABN, and an EPC. The E-UTRAN consists of at least one E-UTRAN node. The E-UTRAN node is an entity corresponding to the BS 20 shown in FIG. 2. The E-UTRAN node consists of at least one en-gNB 23 and/or at least one eNB 20. The en-gNB 23 provides NR user plane and control plane protocol terminations towards the UE 11. The eNB 20 provides E-UTRA user plane and control plane protocol terminations towards the UE 11.

The EPC includes an MME and a S-GW. The en-gNB and the eNB are connected together via an X2 interface. The en-gNB and the eNB are connected to the EPC via an S1 interface NG, more specifically to the MME and/or the S-GW via an S1-U and/or S1 interface.

Figure 9:
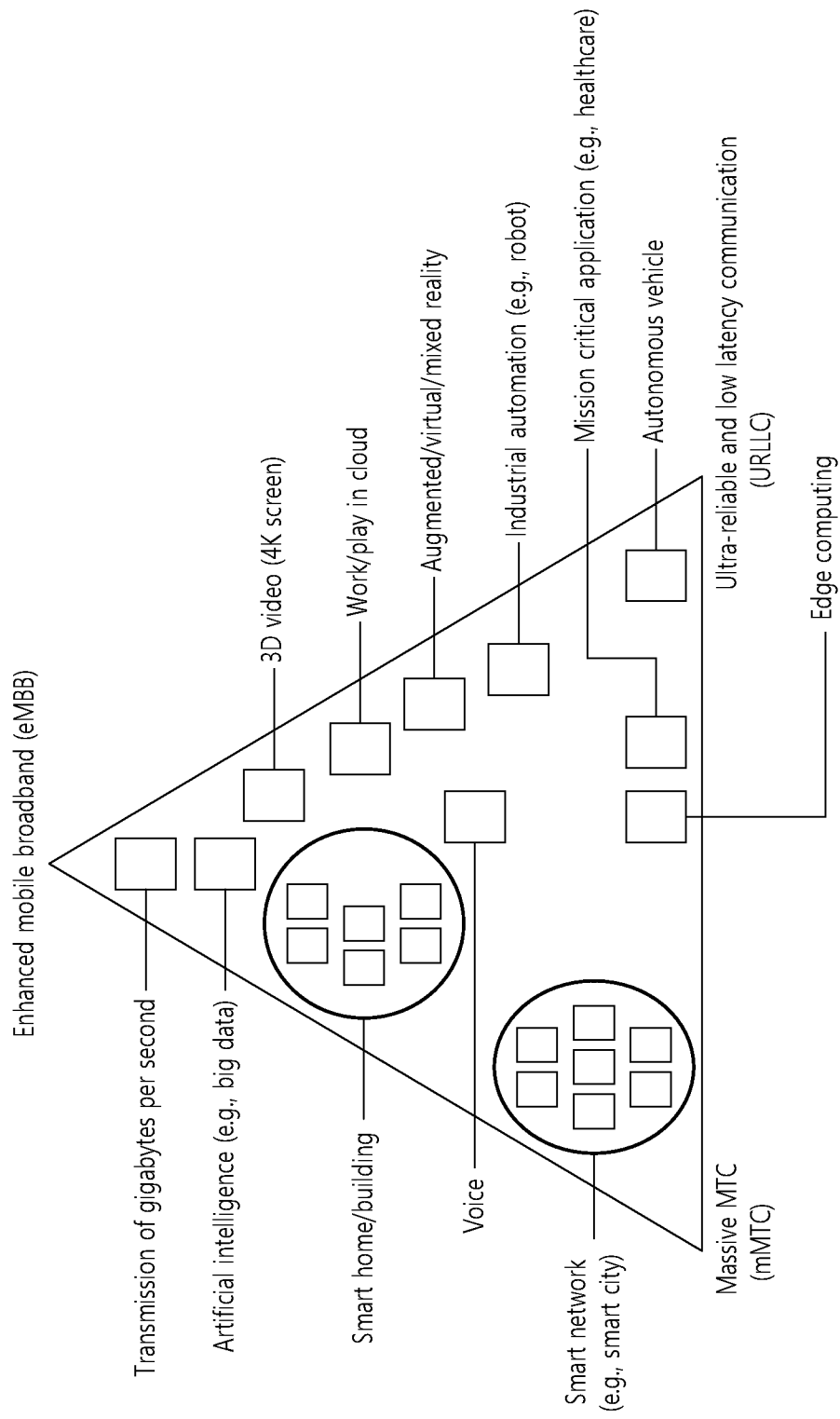
FIG. 9 is a view showing examples of a 5G usage scenario to which technical features of the present disclosure may be applied.

FIG. 9 is a view showing examples of a 5G usage scenario to which technical features of the present disclosure may be applied. The 5G usage scenarios shown in FIG. 9 are only exemplary, and the technical features of the present disclosure can be applied to other 5G usage scenarios which are not shown in FIG. 9.

Referring to FIG. 9, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization, and other use cases may only focus on only one key performance indicator (KPI). 5G is to support these various use cases in a flexible and reliable way.

eMBB focuses on across-the-board enhancements to data rate, latency, user density, and mobile broadband access capacity and coverage. eMBB aims at a throughput of about 10 Gbps. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims at about 10-year-lifespan batteries and/or about million devices per square kilometer (1 km$^2$). mMTC allows seamless integration of embedded sensors in all areas, and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims at a latency of 1 ms. URLLC includes new services that will change the industry through links with ultra-reliability/low latency, such as remote control of key infrastructure and self-driving vehicles. The level of reliability and latency is essential for smart grid control, industrial automation, robotics, drone control and coordination.

Next, a plurality of use cases included in the triangle of FIG. 9 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and the infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power, and low cost. However, for example, real-time high-definition (HD) video may be required for certain types of devices for monitoring.

<Artificial Intelligence (AI)>

Artificial Intelligence (AI) refers to AI itself or the field for studying how to build AI, and machine learning refers to the field for defining problems related to AI and studying how to tackle the problems. Machine learning is also defined as an algorithm that constantly performs a specific task to improve performance related to the task.

An Artificial Neural Network (ANN) is a model used in machine learning and may refer to entire models consisting of artificial neurons (nodes) forming a network through combination of synapses to solve problems. The ANN may be defined by a connection pattern between neurons on different layers, a learning procedure for updating a model parameter, and an activation function for generating an output value.

The artificial neural network may include an input layer, an output layer, and selectively one or more hidden layers. Each layer may include one or more neurons, and the artificial neural network may include a synapse connecting one neuron to another neuron. In the artificial neural network, each neuron is able to output a value of an activation function with respect to input signals input through a synapse, weight, and bias.

A model parameter refers to a parameter to be decided through learning, and the model parameter includes a weight of synapse connection, bias in a neuron, etc. In addition, a hyperparameter refers to a parameter to be set in a machine learning algorithm before a learning process begins, and the hyperparameter includes a learning rate, the number of repetition, a mini-batch size, an initialization function, etc.

The purpose of training an artificial neural network may be to determine a model parameter that minimizes a loss function. The loss function may be used as an indicator for determining an optimal model parameter in a process of training the artificial neural network.

Machine learning may be classified into supervised learning, unsupervised learning, and reinforcement learning according to a learning method.

The supervised learning may refer to a method for training an artificial neural network with a given label for training data, and a label may refer to an answer (or a result) that an artificial neural network needs to infer when training data is input to the artificial neural network. The unsupervised learning may refer to a method for training an artificial neural network without a given label for training data. The reinforcement learning may refer to a learning method for performing training an agent defined in a certain environment to select an action or action sequence that maximizes accumulative compensation.

Machine learning implemented as a Deep Neural Network (DNN) including a plurality of hidden layers among artificial neural networks may be referred to as deep learning, and deep learning is part of machine learning. Hereinafter, machine learning is used to include deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving or Autonomous Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to ahead-mount display (HMD), ahead-up display (HUD), a mobile phone, a tablet PC, a laptop, a desktop, a TV, a digital signage, and the like. A device to which the XR technology is applied may be referred to as an XR device.

5G NPN and Network Security Monitoring

Figure 10:
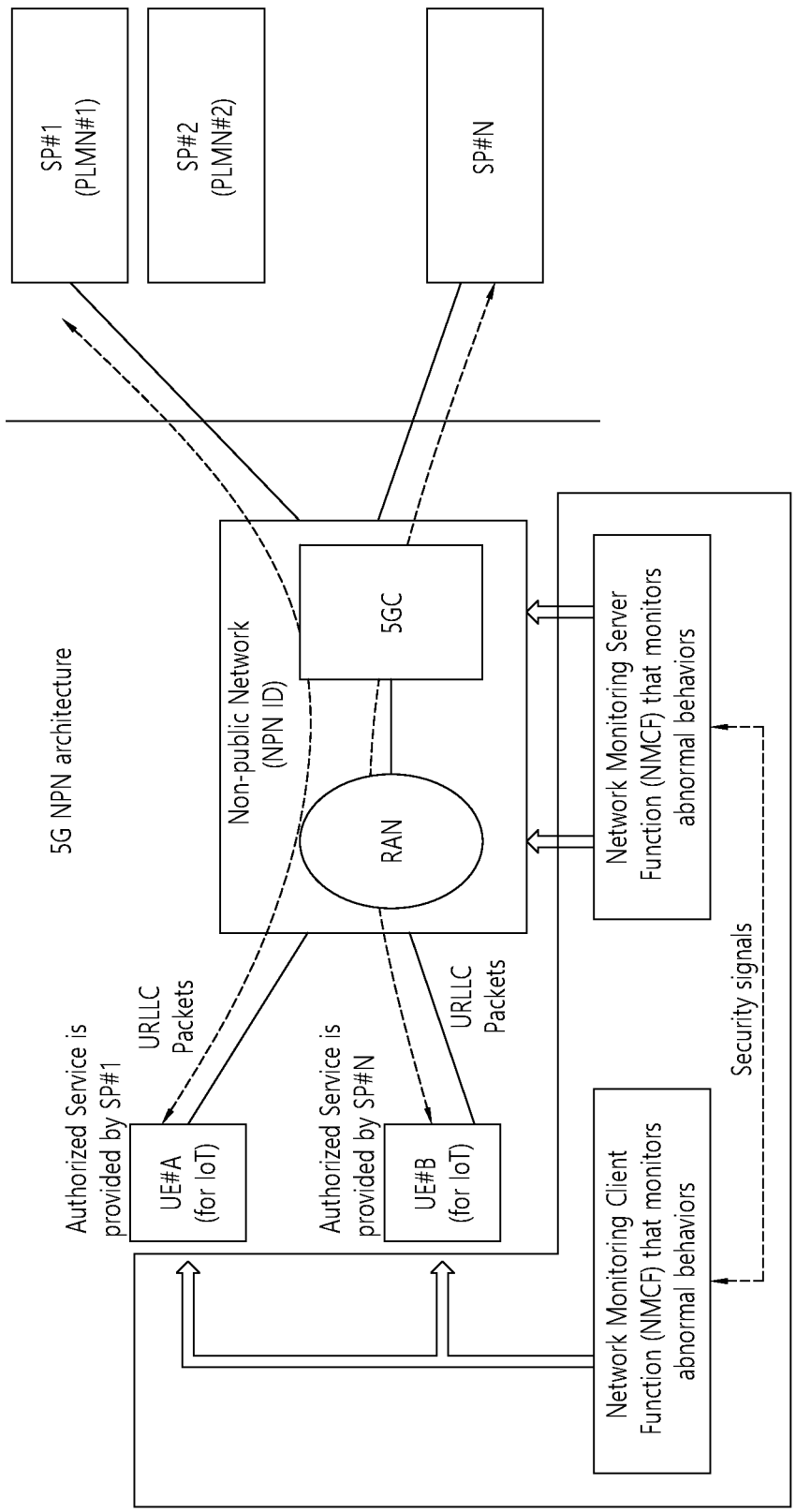
FIG. 10 is a view showing a further example of a wireless communication system to which technical features of the present disclosure may be applied.

FIG. 10 is a view showing a further example of a wireless communication system to which technical features of the present disclosure may be applied. Specifically, FIG. 10 shows a system architecture system architecture based on a 5G NPN (non-public network) system. According to 3GPP TS 22.261, NPNs are referred to as private networks, and may be deployed in a variety of configurations, utilizing both virtual and physical elements. Here, NPNs may be deployed as completely standalone networks, may be hosted by a PLMN, or may be offered as a slice of a PLMN. Besides, NPNs may also be called by other terms, such as an enterprise business network, an enterprise-dedicated network, an enterprise private network, a government affairs network, a government-dedicated network, a government private network, a smart factory-dedicated network, and a smart city-dedicated network.

5G NPN is desirable for isolation from public 5G networks in order to ensure high-quality service requirements, high security requirements using dedicated security credentials, and security/privacy/performance/safety and to prevent malfunctioning.

5G technology is used to construct a 5G vertical service based on real-time IoT devices in smart factories and smart cities, by using URLCC which are requirements of 5G. In implementing such 5G vertical services by 5G NPNs, the 5G NPNs need to satisfy requirements of 5G from the perspective of security and performance when processing time-sensitive data of the IoT devices.

Referring to FIG. 10, a 5G NPN may include RAN and 5GC. The 5G NPN may be assigned an ID (NPN ID) for identification from other NPNs. A number of service providers (SP) SP #1, SP #2, . . . , SP #N may provide a URLLC packet service to each terminal UE #A and UE #B camping on or connected to the 5G NPN.

In this case, for security and performance monitoring in the 5G NPN, an entity within a radio access network (RAN) or an entity within a 5G core network an NMSF may be provided with an NMSF, and user equipment UE #A and UE #B may be provided with an NMCF. Also, a specific protocol may be defined between the NMSF and the NMCF so that signals related to performance or security are sent to and received from. That is, once the 5G NPN is provided with an NMSF and an NMCF, the network administrator may monitor various problems with security and performance that occur on a communication path between network nodes and end user terminals, and accordingly a variety of vertical services (i.e., URLLC services) provided based on the 5G NPN may be efficiently provided.

A 5G NPN security architecture provides a vertical service that satisfies URLLC requirements by effectively eliminating threats from the inside or outside of the network and minimizing corresponding risks. To this end, a 5G NPN security architecture according to this embodiment may be configured by an NMF. The NMF includes an NMSF and an NMCF. Here, the NMF may be implemented by a deep packet inspection (DPI) function deployed by a network or a dedicated DPI network node. Hereinafter, a method of configuring a 5G NPN architecture including an NMSF and an NMCF will be disclosed based on FIG. 10.

Figure 11:
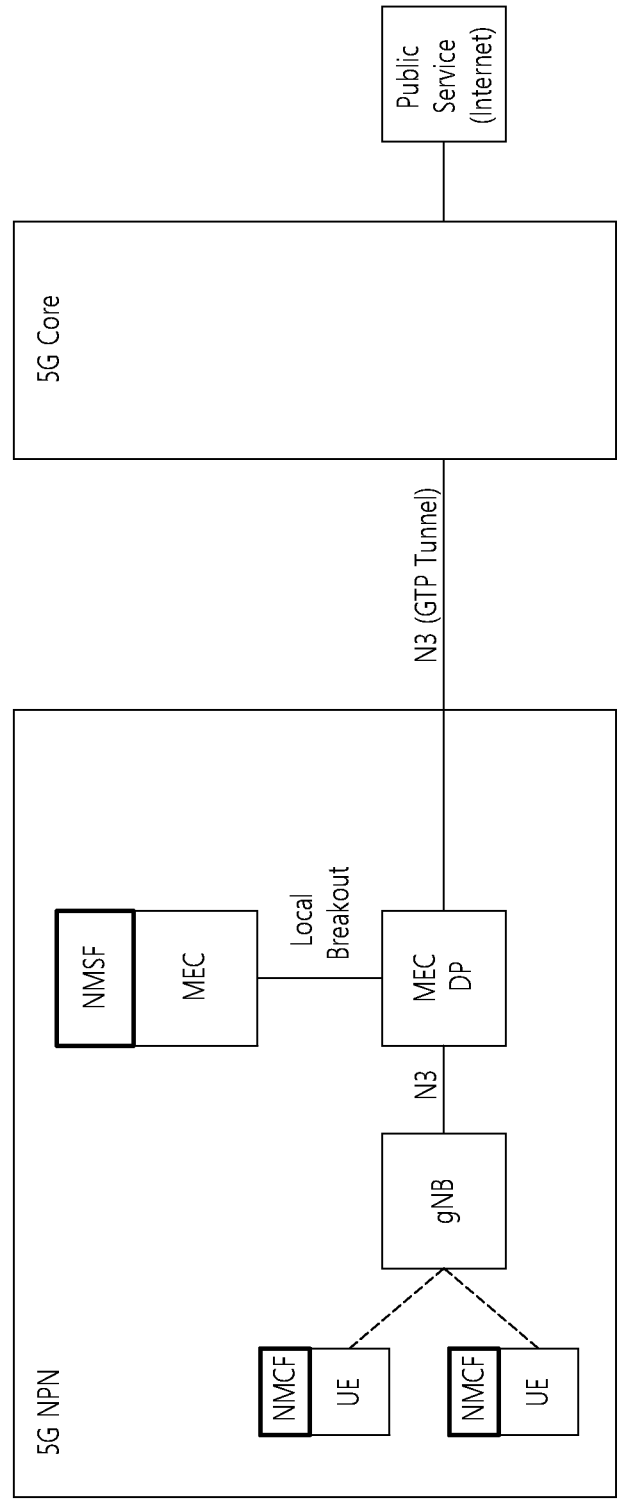
FIG. 11 shows a 5G NPN security architecture providing a network security monitoring function according to an example.

FIG. 11 shows a 5G NPN security architecture providing a network security monitoring function according to an example.

Referring to FIG. 11, an NMCF may be configured as being integrated with a terminal (or client node) constituting a 5G NPN as a module. For example, the NMCF may be stored as software in a chip or memory of a terminal, and may perform an operation of monitoring the security or performance of the terminal (or client node).

An NMSF may be configured as being integrated with a particular network node within a computing set constituting a 5G NPN. For example, the NMSF may be configured as being integrated with an MEC (multiple-access edge computing) which is a computing set or with at least one node (e.g., server node) within the MEC. In this case, the NMSF may be stored as software in a chip or memory within the at least one node, and may perform an operation of monitoring the security or performance of the 5G NPN through packets on an N3 interface that are coming in and out of the at least one node. Here, the MEC is a technology that mitigates core network congestion by deploying various services and caching content close to user equipment by employing a distributed cloud computing technology, and creates a new local service. The MEC may be connected to a DP (data plane).

The NMCF may be integrated with user equipment, particularly, an IoT device, and is capable of communication with a gNB. Mounting the NMCF on an IoT device is one of effective means for ensuring security and URLLC performance in the 5G NPN. The NMCF may be implemented as software, and may be called an endpoint detection and response (EDR) entity or a micron engine (ME). The NMCF server may be located within the 5G NPN or at an edge cloud or within a common network domain. Terminals are connected wirelessly. Each terminal transmits packets to the gNB or receive packets from the gNB. The gNB may be connected to a 5G core network or be connected to a local network via an N3 interface. In this case, the packets flow through the N3 interface.

Figure 12:
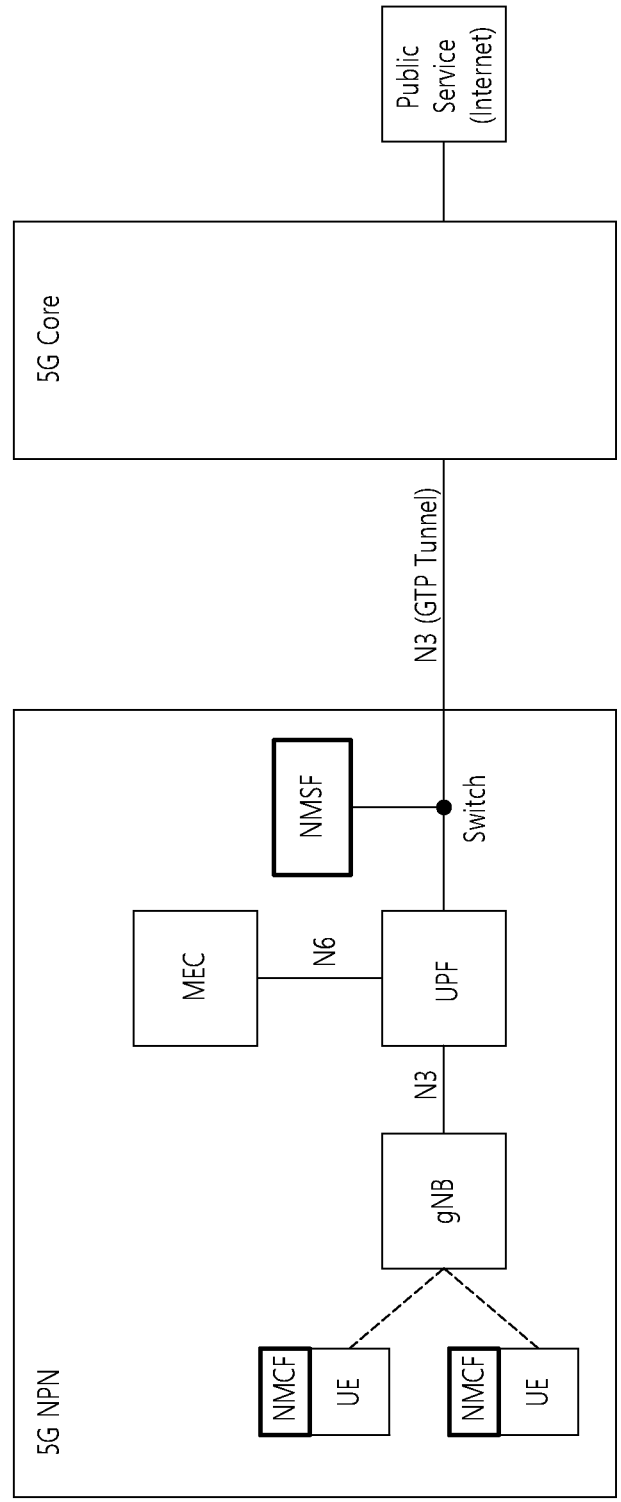
FIG. 12 shows a 5G NPN security architecture providing a network security monitoring function according to another example.

FIG. 12 shows a 5G NPN security architecture providing a network security monitoring function according to another example.

Referring to FIG. 12, an NMCF may be configured as being integrated with a terminal (or client node) constituting a 5G NPN as a module. For example, the NMCF may be stored as software in a chip or memory of a terminal, and may perform an operation of monitoring the security or performance of the terminal (or client node).

An NMSF is a standalone network node constituting the 5G NPN, which may be separated from other network nodes or entities. For example, the NMSF may be configured as a standalone network node separated from a UPF or an MEC.

In one aspect, the NMSF may be coupled to an input end (e.g., N3 interface) or output end (e.g., N4 interface) of the UPF or coupled to an input end or output end of the MEC, for monitoring the security or performance of the 5G NPN through packets on the N3 and/or N4 interfaces. In a case where an NMSF is coupled to the output end of the UPF, the 5G NPN security architecture may further include a switching device for breaking out the N4 interface in order to mirror the packets on the N4 interface.

The NMCF and the NMSF may perform communication through the N3 and/or N4 interface, for example, in order to share a security-related signal such as a monitoring result in the NMCF, and the sharing of the security-related signal may be based on an IP designated for the NMSF. If the 5G NPN uses a node-to-node encryption function such as IPSec, the NMSF may be configured at a point where decoded packets from the node are outputted.

Figure 13:
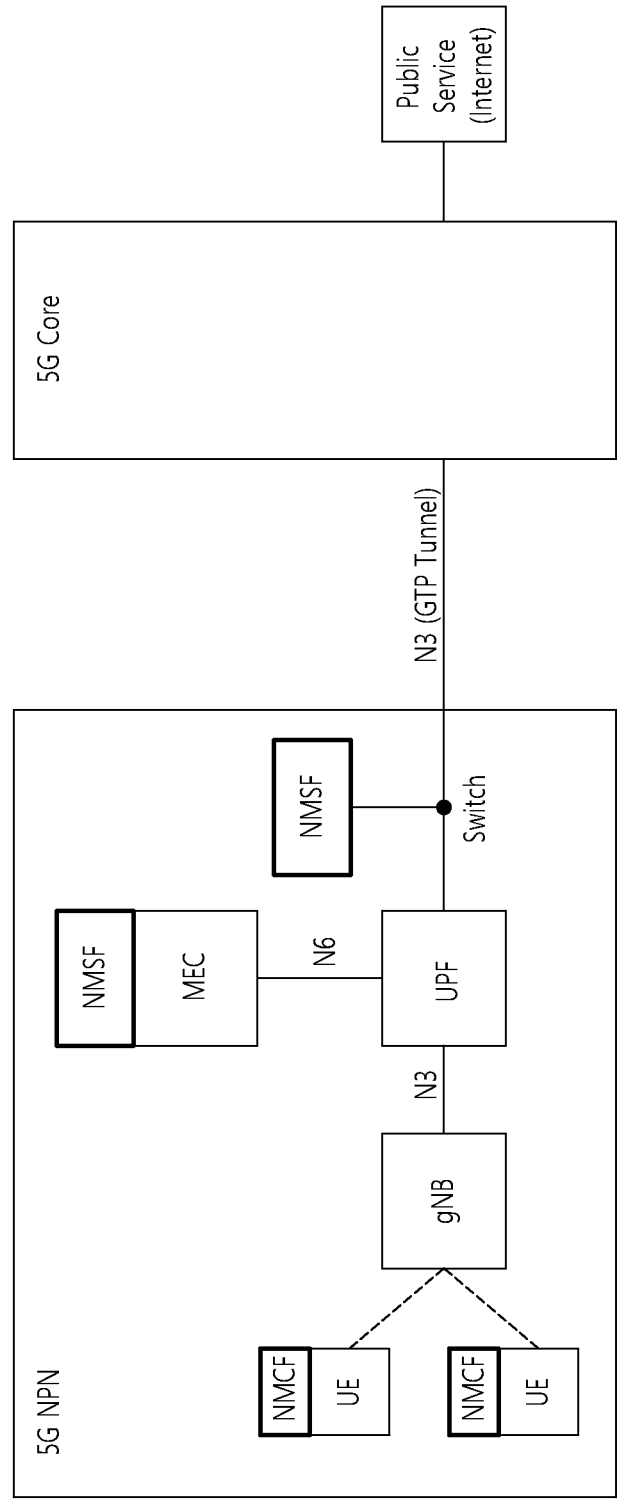
FIG. 13 shows a 5G NPN security architecture providing a network security monitoring function according to yet another example.

FIG. 13 shows a 5G NPN security architecture providing a network security monitoring function according to yet another example. FIG. 13 is different from FIGS. 11 and 12 in that a plurality of NMSFs are configured within a single 5G NPN.

Referring to FIG. 13, an NMCF may be configured as being integrated with a terminal (or client node) constituting a 5G NPN as a module. For example, the NMCF may be stored as software in a chip or memory of a terminal, and may perform an operation of monitoring the security or performance of the terminal (or client node).

A plurality of NMSFs may be configured within the 5G NPN. A first NMSF may be configured as being integrated with a particular network node within a computing set constituting the 5G NPN. For example, the first NMSF may be configured as being integrated with an MEC (multiple-access edge computing), which is a computing set, or with at least one node (e.g., server node) within the MEC. In this case, the first NMSF may be stored as software in a chip or memory within the at least one node, and may perform an operation of monitoring the security or performance of the 5G NPN through packets on an N6 interface that are coming in and out of the at least one node.

Also, a second NMSF is a standalone network node constituting the 5G NPN, which may be separated from other network nodes or entities. For example, the second NMSF may be configured as a standalone network node separated from a UPF or an MEC. In one aspect, the second NMSF may be coupled to an input end (e.g., N3 interface) or output end (e.g., N4 interface) of the UPF, for monitoring the security or performance of the 5G NPN through packets on the N3 and/or N4 interfaces. In a case where an NMSF is coupled to the output end of the UPF, the 5G NPN security architecture may further include a switching device for breaking out the N4 interface in order to mirror the packets on the N4 interface.

The NMCF and the first NMSF and/or second NMSF may perform communication through the N3 and/or N4 interface, for example, in order to share a security-related signal such as a monitoring result in the NMCF, and the sharing of the security-related signal may be based on an IP designated for the first and/or second NMSF. If the 5G NPN uses a node-to-node encryption function such as IPSec, the first and/or second NMSF may be configured at a point where decoded packets from the node are outputted.

The above FIGS. 11 to 13 are embodiments of a 5G NPN security architecture in which one or two or more NMSFs and one or two or more NMCFs are disposed in various forms within a 5G NPN. However, the 5G NPN security architectures of FIGS. 11 to 13 are not exclusive of each other, and may be implemented as an embodiment which is a combination of one or two of them depending on their network characteristics and costs. Moreover, an embodiment in which an NMSF and an NMCF are deployed within a 5G NPN may be derived in various ways other than those in FIGS. 11 to 13, and it is needless to say that NMSFs may be integrated with other network entities or network nodes which are regardless of the UPF and/or the MEC.

According to a 5G NPN security architecture according to the present specification, effective security and performance monitoring in the 5G NPN may be achieved based on the NMSF and the NMCF.

Hereinafter, functions of an NMSF and an NMCF constituting a 5G NPN security architecture will be described in more detail.

First, the NMSF is configured to perform at least one of the following functions.

For example, the NMSF performs a function of obtaining at least one mirrored packet by mirroring a packet sent or received between a client node and a server node. Here, the client node may be a UE or an IoT device, for example. Packet mirroring is a technique of collecting and analyzing packets exchanged at a particular node. The NMSF also may further include a switching function or switching device (also referred to as a switch) for branching a connecting line between nodes for packet mirroring.

As another example, the NMSF performs a function of determining abnormal operations or security problems that threaten the security and performance of the 5G NPN based on information contained in the mirrored packets.

As yet another example, the NMSF performs an alerting function for an abnormal operation that disturbs URLLC requirements, based on security and performance monitoring results. Upon detecting an abnormal operation that threatens security or performance, the NMSF allows the user to properly deal with the abnormal operation by informing the user of this. The NMSF also sends alerting information to a security controller. The alerting information is information that instructs the security controller to take action against the abnormal operation. Upon receiving the alerting information, the security controller performs an operation (e.g., network shutdown) of recovering from the abnormal operation. The alerting information may be sent via an N3 and/or N4 interface provided by a 3GPP signaling protocol.

Next, the NMCF is configured to perform at least one of the following functions.

For example, the NMCF performs a function of collecting packets or internal information sent and received by a client node on the network.

As another example, the NMCF performs an operation of monitoring and determining network security threats associated with a client node based on the collected packets or internal information.

As yet another example, the NMCF performs an operation of notifying the NMSF of network security threat monitoring results by using an IP designated for the NMSF.

As a further example, the NMCF may display an alert to a user of an IoT device about an abnormal terminal operation.

As a further example, in performing the listed functions, the NMCF operates using computing resources of individual client nodes or IoT devices, and uses an amount of resources that will not affect the basic performance and functions of the individual client nodes or IoT devices.

Since the NMCF is able to sense an abnormal operation through data generated from a client node or an IoT device, it is capable of detecting the security status of the client node or the IoT device more accurately than the NMSF. Further, if the number of IoT terminals connected to the 5G NPN increases exponentially, monitoring all data flows can be a big burden to the NMSF, and therefore it is more effective to monitor the security and performance of the 5G NPN in cooperation with the NMCF. The NMCF integrated with the client node or the IoT device may stop operating due to a problem (e.g., power shutdown) with the client node or IoT device itself. Thus, the monitoring of security and performance by the NMSF is essential.

Calculation of Network Performance Indicators According to Packet Mirroring and Packet Analysis by Network Monitoring Apparatus The following embodiment relates to a method of calculating network performance indicators according to packet mirroring and packet analysis by an NMSF. For convenience of explanation, the NMSF will be represented as a network monitoring apparatus.

Figure 14:
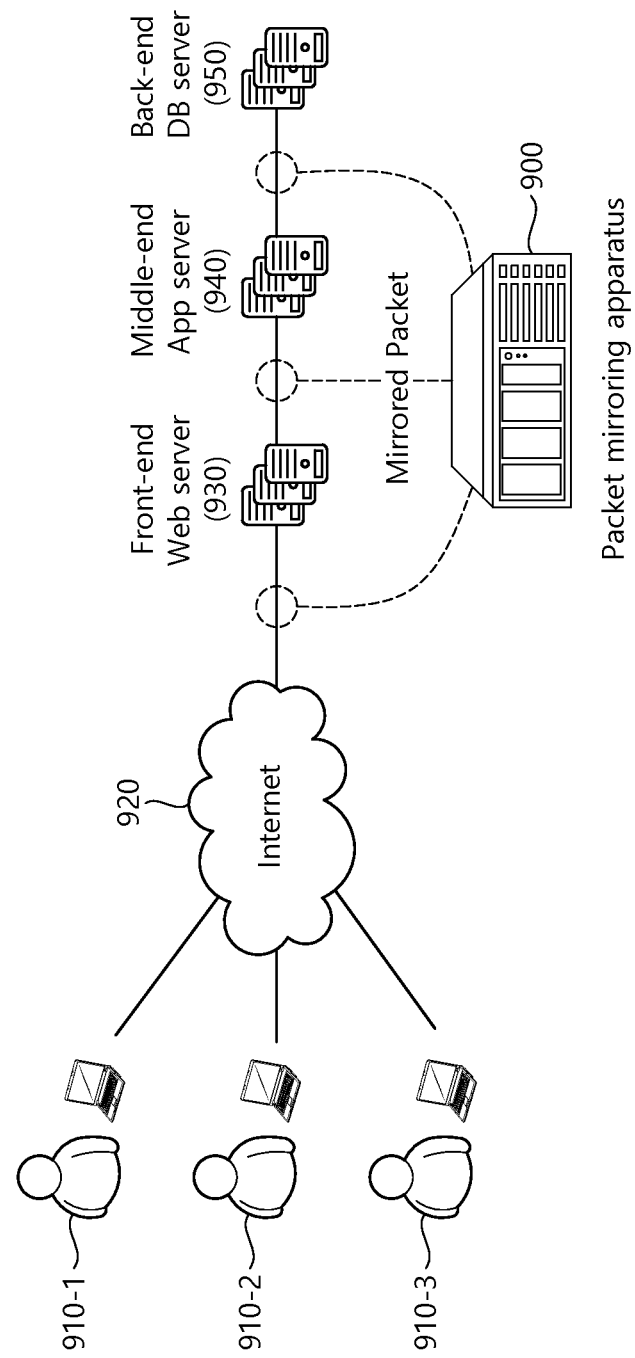
FIG. 14 is a conceptual diagram showing a system including a network monitoring apparatus according to an embodiment of the present disclosure.

FIG. 14 is a conceptual diagram showing a system including a network monitoring apparatus according to an embodiment of the present disclosure. As illustrated in FIG. 14, a network security and performance monitoring system according to an embodiment of the present disclosure may include user devices (same as the UEs in the previous drawings) 910-1 to 910-3, a network 920, sever endpoints 930 to 950, and a network monitoring apparatus 900. A network in this embodiment may include a 5G NPN, and the sever endpoints 930 to 950 may include an MEC.

Referring to FIG. 14, the user devices 910-1 to 910-3 connect to a particular web site and/or a web application through the network 920. Here, the user devices 910-1 to 910-3 may be a handheld terminal, robot, or IoT device (e.g., sensor) on a 5G network. The connection is made at the sever endpoints 930 to 950 associated with the web site and/or the web application.

According to the embodiment of FIG. 14, the user devices 910-1 to 910-3 access a particular web page through a web browser and make a request to run a desired page or application. The request may include running of multimedia content such as video and audio and/or other applications, as well as static content such as html documents.

According to an embodiment of the present disclosure, the user devices 910-1 to 910-3 may include a certain device that is operated by a user and includes a communication function (including internet access and web browser execution function and a data processing function. The user devices 910-1 to 910-3 may be referred to as a mobile station (MS), user equipment UE, a user terminal (UT), a wireless terminal, an access terminal (AT), a terminal, a stationary or mobile subscriber unit, a subscriber station (SS), a cellular phone, a wireless device, a wireless communication device, a wireless transmit/receive unit (WTRU), a mobile node, a mobile, a mobile station, a personal digital assistant (PDA), a smartphone, a laptop, a netbook, a personal computer, a wireless sensor, consumer electronic equipment, a robot, an IoT device, or other terms. Various embodiments of the user devices 910-1 to 910-3 may include, but not limited to, cellular telephones, smartphones having wireless communication capabilities, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances enabling wireless Internet access and browsing, as well as portable units or terminals that incorporate combinations of such functions.

Each user device 910-1 to 910-3 may include a user communication interface including input devices such as a mouse and keyboard for receiving user input, and a display for providing a control user interface for a user to interact with networked devices. The user interface can include a graphical user interface (GUI) for providing information to the user.

The network 920 may include a wired and/or wireless network. The network 920 may include the Internet, and includes a 5G SA (standalone) system or a 5G NSA (non-standalone) and/or 4G system. The network 920 may include a serial bus that provides a physical layer (medium) to send and receive data between various connected user devices 910-1 to 910-3 and the sever endpoints 930 to 950. Here, the serial bus may include a 1394 serial bus. The 1394 serial bus may support, but is not limited to, both time-multiplexed audio/video (A/V) streams and standard IP (Internet Protocol) communications (e.g., IETF RFC 2734). The network 920 may include a non-1394 network (e.g., Ethernet, etc.) as well. Also, the network 920 may include a home network. Each user device 910-1 to 910-3 may communicate with one or more server devices 930 to 950 in the network 920.

The sever endpoints 930 to 950 respond to requests from users by using resources of the network 920, in order to provide services to the users. The sever endpoints 930 to 950, though they are put that way, are not necessarily need to be a server related to a particular web site. They may be a single server device. In this specification, the term "server" may refer to another entity communicating with a particular user device 910-1 to 910-3, a target entity the user device 910-1 to 910-3 has requested to communicate with, a controller device (a central controller for controlling a robot or an IoT device) that controls the user device 910-1 to 910-3, and/or a base station (eNB, gNB, etc.).

The sever endpoints 930 to 950 perform returning of information (data) in response to a request from the user device 910-1 to 910-3. Also, the returning may include returning of the performance (e.g., mechanical performance) and state of a function, returning of a data stream and its state, receiving a data stream and returning of its state, or saving of states for various actions. The sever endpoints 930 to 950 may include a custom, embedded, and control program to implement control of their own hardware.

The sever endpoints 930 to 950 may be associated with a particular web site and/or web application, and performs calculations and management related to tasks performed at each web site and/or web application. The sever endpoints 930 to 950 may interact with the user devices 910-1 to 910-3 and other servers 930 to 950. Exemplary services may include MPEG sourcing/sinking and display services.

The sever endpoints 930 to 950 may process information such as interface data (e.g. HTML, XML, Java, JavaScript, GIF, JPEG, MPEG, graphics files, or any other format useful for the intended purpose) that provides an interface for commanding and controlling of the device over the network. In certain embodiments, each server 930 to 950 may process information such as one or more Hypertext markup Language (HTML) pages that provide for the commanding and controlling of that device. Using the browser technology, the sever endpoints 930 to 950 employ Internet standards to render HTML pages.

According to an embodiment of the present disclosure, the sever endpoints 930 to 950 may include a web server 930, an APP server 940, and a database server (DB server) 950. However, the sever endpoints are not necessarily composed of a combination of three servers. Only the web server 930 may be present but not the app server 940 and the database server 950, whereas the APP server 940 alone may be present or other server combinations of various forms and layers are possible.

The web server 930 is a server that provides requested content to a web client. The web server 930 may provide static images such as HTML, JPEG, or GIF to a web browser through an HTTP protocol. In some cases, the web server 930 also may have a container embedded in it, for running an internal application.

The APP server 940 may be called a WAS (web application server) server, which is a middleware software server that provides transaction processing and management and an application execution environment in a client/server environment. Typically, the sever endpoints 930 to 950 may be constructed in a three-layer web computing environment of a web server, an application server, and a database. In this case, the APP server 940 serves as an application server in the client/server environment. The APP server 940 provides an application execution environment a database access function, manages transactions, performs a business logic for handling tasks, and performs interfacing of an application between different types of systems.

According to an embodiment of the present disclosure, effective distribution may be induced through functional classifications of the web server 930 and the WAS 940. Static data may be processed by the web server 930 which exists at the front in structure, and dynamic data may be processed by the WAS 940 at the back. For example, for a user's request, static data such as HTML and Java Script files, CSS, and images is located at and processed by the web server 930 at the front, so that the service request is not passed to the WAS 940. Also, the WAS 940 may focus on running web applications by passing web application services to the WAS 940 which is located at the back. The method of processing some data by the web server 930 and passing some data to the WAS 940 may be performed through a configuration of the web server 930. Whether to pass a particular extension or directory task to the WAS 940 or not is handled by the web server 230.

The database server 940 is an area for storage of various types of data handled by the web server 930 and/or the APP server 940. The database server 950 may store tremendous amounts of data associated with tasks, websites, and web applications processed by the web server 930 and/or APP server 940, depending on the characteristics of those tasks, websites, and web applications. This data may include personal information, organization information, and data associated with various content (e.g., multimedia content).

The network monitoring apparatus 900 may be disposed at least one of between the network 920 and the web server 930, between the web server 930 and the APP server 940, and between the APP server 940 and the database server 950. The network monitoring apparatus 900 is connected to a switching device (not shown) disposed at least one of between the network 920 and the web server 930, between the web server 930 and the APP server 940, and between the APP server 940 and the database server 950 to diagnose the performance of a network service based on mirrored packets of packets sent and received between two entities. According to the embodiment of the present disclosure, the mirrored packets may be generated by duplication based on packets (actually used user traffic) actually sent and received, so there is no need to artificially generate test packets for the performance diagnosis of the network service. In particular, the network monitoring apparatus 900 is capable of monitoring all packets in real time.

The network monitoring apparatus 900 calculates various indicators in real time which represent the performance of the network service based on various information included in the mirrored packets (e.g., a source ID, a destination ID and time information, input port information, output port information, etc.). The calculation of indicators may be done in units of transactions. More than 120 indicators may be calculated, which will be described below in more detail with reference to FIG. 12. The network monitoring apparatus 900 may determine by section whether there is a problem such as speed latency, queuing delay, overflow traffic, and error occurrence in a certain section and visualizes a determination result so that the administrator or manager can see it. That is, an error section may be quickly detected, and, based on this, the error section may be quickly dealt with.

Moreover, the network monitoring apparatus 900 is able to tracking accesses (related to security issues) from malicious users by analyzing mirrored packets, and may deal with this in real time.

According to the embodiment of the present disclosure, the network monitoring apparatus 900 is connected to the switching device, and therefore may not require the installation of an agent which puts a substantial load on the sever endpoints 930 to 950. That is, it does not bear the burden of delaying the working speed of the sever endpoints 930 to 950 or the like. However, the network monitoring apparatus 900 is not necessarily configured in a hardware manner, but may be installed and operate on a switching device or other devices in a software manner.

Figure 15:
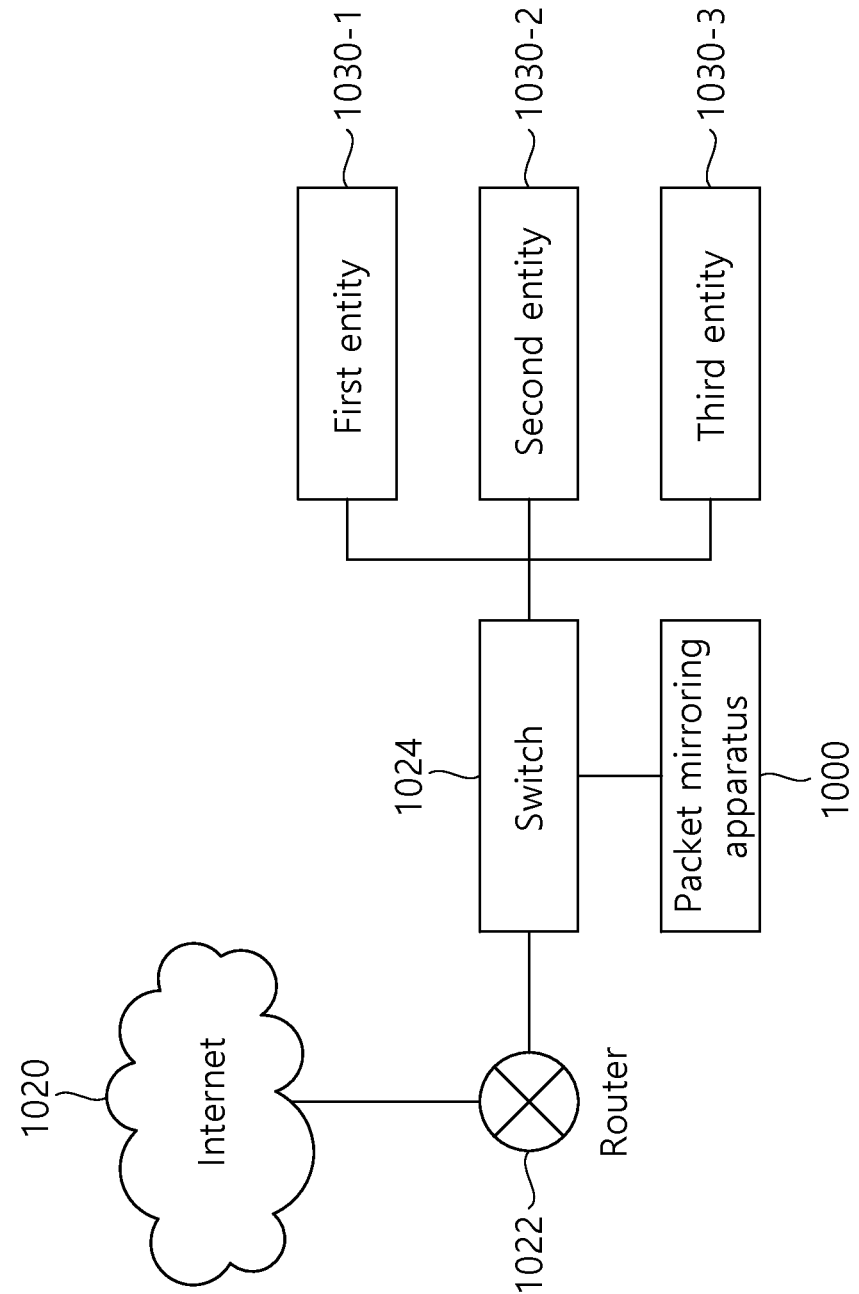
FIG. 15 is a block diagram showing a configuration for connecting a network monitoring apparatus according to an embodiment of the present disclosure and another apparatus in a network.

FIG. 15 is a block diagram showing a configuration for connecting a network monitoring apparatus according to an embodiment of the present disclosure and another apparatus in a network.

Referring to FIG. 15, a router 1022 is connected to a network such as the Internet 1020, and the router 1022 is connected to a switch 1024 and sends a request from a user terminal (not shown) to servers 1030-1 to 1030-3 related to the request and sends information related to a response to the request from first to third entities 1030-1 to 1030-3 to the user terminal. The first to third entities 1030-1 to 1030-3 may be different servers. Alternatively, the first to third entities 1030-1 to 1030-3 may be different user terminals as viewed from the client side, and the network monitoring apparatus 1000 may analyze packet-related information by mirroring packets for communication between the user terminals because these packets also pass through the switch 1024.

The router 1022 or a router (not shown) having a routing function extracts the location and recipient of a packet transmitted from a user terminal and designates an optimum path for that location and directs the data packet to the switch 1024 along this path. The router 1022 identifies the IP address and forwards the data to the switch 1024.

If the first to third entities are servers, the switch 1024 stores unique MAC addresses of the servers 1030-1 to 1030-3, determine which packets should be transmitted via these addresses and where, and send a packet provided from the router 1022 to a corresponding server 1030-1 to 1030-3. The switch 1024 includes a switch that serves as an OSI 2 layer, an OSI 3 layer, an OSI 4 layer, and/or another layers (e.g., OSI 7 layer). For example, it may perform a function of configuring a path. Also, it may perform functions like load balancing, port forwarding, QoS, and the like. The switch 1024 also may be referred to as a network switch, a switching hub, a port switching hub, or the like.

The network monitoring apparatus 1000 is connected to the switch 1024 and mirrors and obtains almost every packet provided to the servers 10301 to 1030-3 through the switch 1024. Packet mirroring, that is, packet duplication or capture, may performed by the switch 1024. In some cases, this may be performed by the network monitoring apparatus 1000 itself. The switch 1024 may duplicate a packet provided to the servers 1030-1 to 1030-3, and then a port connected to the network monitoring apparatus 1000 may be configured as a destination port and provided to the network monitoring apparatus 1000. In this instance, this port may be designated and provided for analysis purposes.

Figure 16:
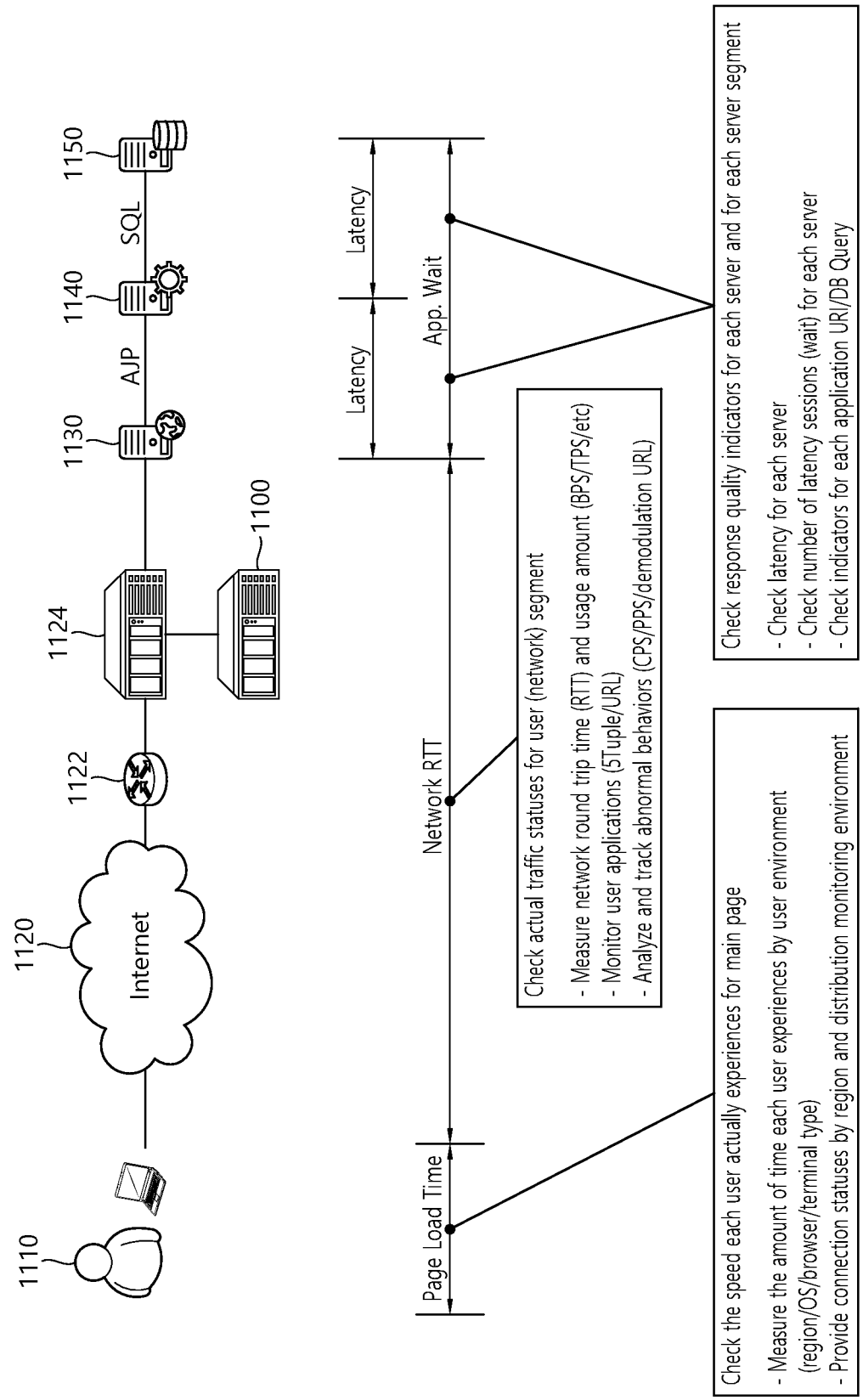
FIG. 16 is a conceptual diagram for explaining how a network monitoring apparatus according to an embodiment of the present disclosure operates for each segment.

FIG. 16 is a conceptual diagram for explaining how a network monitoring apparatus according to an embodiment of the present disclosure operates for each segment.

Referring to FIG. 16, as explained with reference to FIGS. 14 and 15, a user terminal 1110 sends packets to sever endpoints 1130, 1140, and 1150 via the Internet 1120, in which case a router 1122 and a switch 1124 are present between the Internet 1120 and the server 1130, and a network monitoring apparatus 1100 is connected to the switch 1124.

The network monitoring apparatus 1100 may check the amount of delay time the user experiences on the user terminal 1100 by analyzing mirrored packets. Also, it is possible to obtain information related to traffic to the first server 1130 via the Internet 1120, and to check the latency at the server endpoints 1130, 1140, and 1150. In particular, the latency at the server endpoints 1130, 1140, and 1150 is determined for each segment. Latency may be calculated and handled separately for the segment between the web server 1130 and the WAS 1140 and the segment between the WAS 1140 and the DB server 1150. Web latency and App latency may be calculated separately. Here, the web latency refers to a period of delay until a static URL (image (gif, png, jpg, etc.), css, js, text, and so on) receives data from the web server 1130, and the App latency refers to a period of delay until a first packet of a generated page is received from a dynamic URL or a post URL. The App latency may be associated with dynamic content containing a query parameter, dynamic content (page) such as HTML, ASP, JSP, and PHP, and/or a call using an HTTP POST method. That is, it represents a delay time related to a task that is returned via the WAS server 1140 and/or the DB server 1150.

First, the speed the user experiences on the user terminal 1110 is assumed to be page load time. It is analyzed and visualized as the speed each user experiences for each main web page. That is, when there are multiple users accessing a particular web page, the amount of time these multiple users experience by user environment and/or by region. The user environment may vary depending on the OS installed on the user terminal, the type of web browser, and the type of terminal. Also, connection statuses by region and a distribution monitoring environment may be provided. In this instance, the regional access statuses may be divided into global regional statuses targeted for the entire world and local regional statuses targeted for regions within the country.

An actual traffic status for a user segment (network segment) until the server 1130 is reached may be represented by a network round trip time (RTT). It also may be referred to as the time taken across a network. In addition, in relation to usage amount, BPS (Bit Per Second) information indicating a data transfer rate per second, UPS (User Per Second) information indicating the number of users connected per second, CPS (Connection Per Second) information indicating the number of new sessions connected per second, and TPS (Transaction Per Second) information indicating the number of transactions made per second may be obtained as well. Moreover, user applications may be monitored, and abnormal behaviors by users may be analyzed and tracked. Through these performance-related indicators, applications occupying network traffic may be detected, and correlations between user, application, and network may be monitored.

Additionally, the network monitoring apparatus 1100 may check a period of delay between each server 1130, 1140, and 1150. That is, response quality indicators for each server segment may be determined. Here, latency for each server, number of latency sessions (wait) for each server, and indicators for each application URI, and/or indicators for each query of a DB server (DB query) may be determined.

Figure 17:
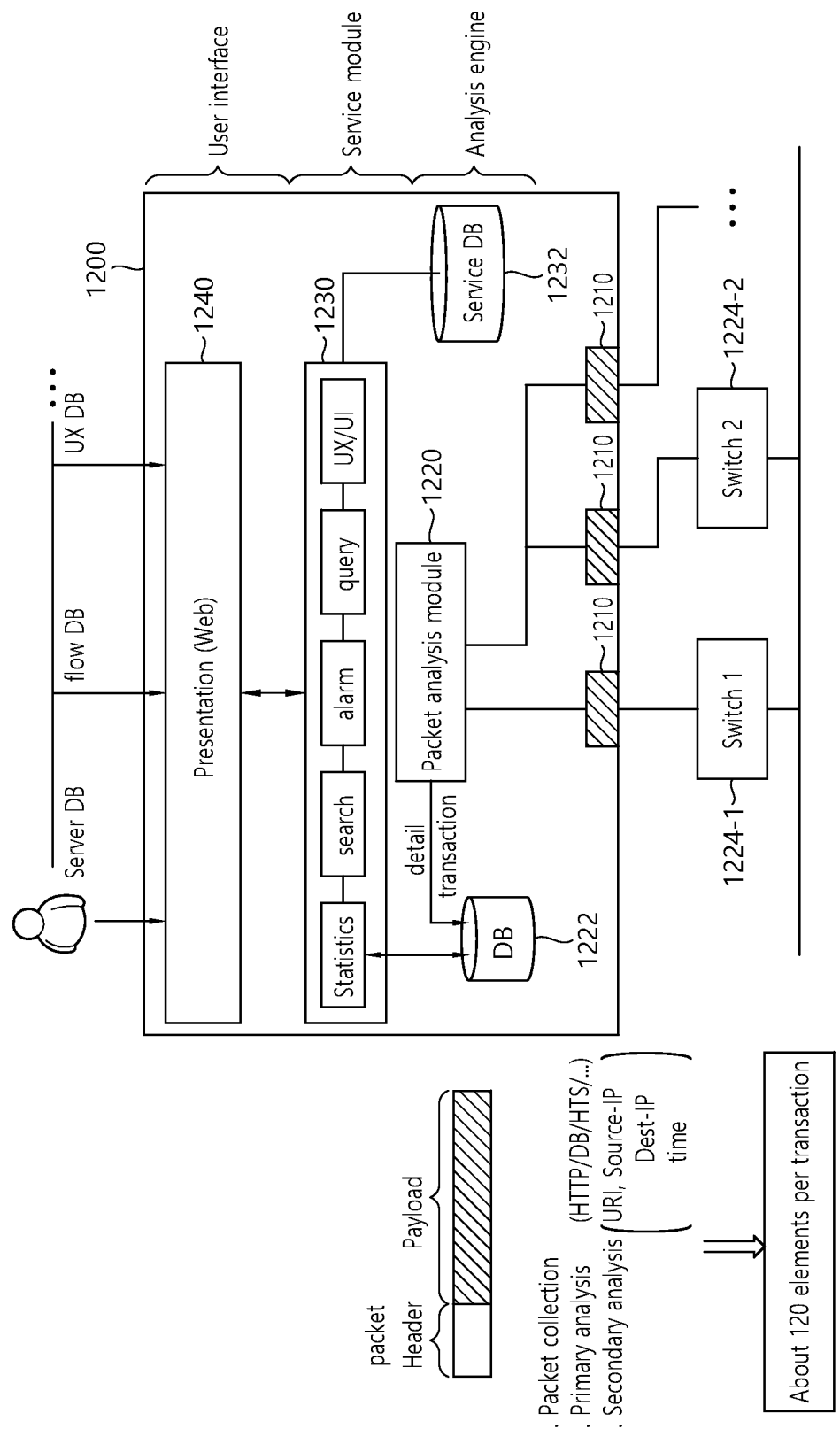
FIG. 17 is a block diagram showing in specific details a network monitoring apparatus according to an embodiment of the present disclosure.

FIG. 17 is a block diagram showing in specific details a network monitoring apparatus according to an embodiment of the present disclosure. As illustrated in FIG. 17, a network monitoring apparatus 1200 according to an embodiment of the present disclosure may include a port 1210, a packet analysis module 1220, a service module 1230, and a user interface 1240. Also, it may further include a packet analysis database 1222 and a service database 1232.

Referring to FIG. 17, at least one port 1210 may be provided, and is connected to switching devices 1224-1, 1224-2, . . . . A single port may be connected to a single switching device. The connected ports may receive information on mirrored packets from the switching devices 1224-1, 1224-2, . . . and send the mirrored packets to the packet analysis module 1220.

The packet analysis module 1220 collects a mirrored packet, and substantially analyzes the packet. It may be referred to as an engine. The packet analysis module 1220 primarily analyzes the header of the packet from the mirrored packet. By this, it is possible to identify whether the packet is an HTTP packet, a packet related to a DB, or a packet related to a TCP. That is, it is identified which protocol the packet is related to. By this, it is possible to find out to which server request information such as "GET/web address/HTTP/1.1" is transmitted to. The packet analysis module 1220 construes by parsing such packet header information. "GET" is a request message, and "web address" is a web address related to the request. Also, "HTTP/1.1" refers to an HTTP 1.1 version, and besides linguistic information (e.g., ko-kr) related to the packet may be obtained and stored. In a request method, POST, HEAD, PUT, DELETE, etc., in addition to GETM, may be sent depending the situation, and the packet analysis module 1220 stores such information along with time information and a related IP.

The packet analysis module 1220 assigns an index to each packet, and identifies whether the packet is a corresponding pocket, that is, an HTTP-based request packet, or a response packet for it. In this case, a comparative analysis of information obtained from previously received packets is conducted. That is, when there is a request packet obtained from a first entity, there may be a response packet from a second entity afterwards. In this instance, one session establishment and transaction flows may be analyzed based on at least two time-series packets and packets transmitted to and received from the first and second entities.

Moreover, the packet analysis module 1220 may find out which browser the user terminal has used, and parse HOST-related information, previous URL address information, and browser support language information. In this instance, the header may be analyzed to find out which type of header it is (a general header, a request header, or an entity header), and information indicating a boundary between the header and the payload may be parsed.

Next, the packet analysis module 1220 secondarily analyzes URL (Uniform Resource Locator) (or URI(uniform resource identifier)) of a mirrored packet, a source IP (Source_ip) destination ID (Dest_ip), and time information. Here, the URL may indicate which address the packet is redirected to, as in "https//www.google.co.kr/?gws_rd=ssl". Also, the source IP may indicate the IP address of the user terminal, and the destination IP may indicate the IP of a server related to a final destination site. In the case of a response packet, this information may be put the other way around. The time information may be provided in the form of a time stamp. Besides, length information of the entire packet may be obtained.

The packet analysis module 1220 includes packet analysis algorithms corresponding to different protocols, that is, various protocols such as HTTP, IP, UDP, TCP, and DNS, for example, and may adaptively extract URL, source IP, destination IP, and time information from a packet according to each protocol and use them on analysis.

Based on such packet-related information extracted by the secondary analysis, performance indicator information of about 120 elements per transaction may be generated. Preferably, 6,000 transactions are analyzed in a second. Then, the extracted packet-related information and the information of about 120 performance indicators generated per transaction are stored in the database 1222. Hereinafter, performance-related indicators generated based on packet-related information of mirrored packets will be described in more detail.

The packet analysis module 1220 calculates round trip time information (RTT information) in units of transactions. That is, it calculates round trip time information of a signal.

Also, the packet analysis module 1220 generate session information. It may refer to the number of sockets established per second, that is, the number of sockets connected without being connected. Also, the packet analysis module 1220 calculates latency information which is the time it takes for the user terminal to send a request and receive a response from a particular server. This may be viewed as the delay time it takes to query a database or run an application or perform other tasks. On the contrary, from the point of view of a server toward a user terminal, the time it takes for the server to send a request and receive a response from a particular user terminal may be calculated as latency.

The packet analysis module 1220 calculates BSS information indicating the length of bits transmitted or received per second, PPS (Packet Per Second) information indicating the number of packets transmitted or received per second, and UPS information indicating the number of users connected per second (for an IP). That is, the number of users connected in a second may be calculated based on the number of source IPs connected to a particular destination IP. Besides, CPS information (indicating how many new sessions are connected in a second) indicating the number of new sessions connected per second and TPS information (indicating how many transactions are made in a second) indicating the number of transactions made per second are calculated. Also, the packet analysis module 1220 calculates HPS (Hit Per Second) information indicating the number of URLs requested per second. In this case, in the case of a server HPS, the packet analysis module 1220 calculates HPS based on the number of URLs requested per second by a server, and in the case of a client HPS, calculates HPS based on the number of URLs requested per second by a client. Also, the packet analysis module 1220 calculates SPS (Server Per Second) information which is the number of servers connected per second. This indicates how many servers the client is connected to in a second.

The service module 1230 provides statistics based on performance-related indicators stored in the database 1222. The statistics may be provided for a particular server, a particular user, each URL, each session, a server group located in a particular region, a client group located in a particular region, and/or each web page. The service module 1230 properly visualizes the performance-related indicators so that the user is able to intuitively know the performance of a service for a current network, by using preset visualization tools of various forms. The visualization is performed based on statistics. That is, a meaningful graph or table may be generated by putting together indicators related to a particular medium. For example, tasks, such as creating a list of sessions at specific hours in relation to a particular client or server or creating a table for a database query generated at that time, may be performed. That is, the performance-related indicators related to a network service are stored along with time information (timestamp information) of the corresponding packet, and therefore a flow map may be created so that a packet flow at specific hours is understood in a relationship with a client terminal and a server endpoint. A variety of statistics and a visualization method for them will be described in more detail with reference to the drawings below.

The service module 1230 may perform search and query based on criterion variables such as a desired time or desired environment (e.g., the type of a particular web browser or the type of a particular user terminal (whether it is mobile or PC)), in order to create a specific graph or a specific table/list in response to an input from the user. The service module 1230 may create visualization information of a proper form by classifying desired data based on a selected criterion variable.

According to an embodiment, the service module 1230 may perform an alarm function which finds out and shows if there is anything wrong, in a network service. For example, if the number of waits is above a threshold, it is determined that there is a problem with the response speed in the corresponding segment, and the problem in that segment may be visually displayed. As a means of alerting to a problem, a visually different representation may be necessarily provided, or a text message may be sent to the user terminal or a warning signal may be sent to it. This will be described in more detail with reference to FIG. 19.

Various statistic data generated by the service module 1230, visualization information data, information related to a visualization tool, information on various thresholds set by the user, and information on various thresholds set by the user may be stored in the service database 1232, and when the user requests certain processed information via the user interface 1240, the corresponding information may be returned.

The user interface 1240 includes a device that receives various inputs from the administrator and outputs visualized information such as a graph or table generated by the service module 1230. It may include an input means such as a mouse, a keyboard, and a touchpad, and an output means such as a monitor and a touchscreen. The user may enter information on a server (e.g., a server name, a server IP, a related URL, a port, a sort number, server location information, an IP area that can be processed, and so on), a flow database related to connections (links) to various server endpoints, and UX/UI database information including a visualization tool for outputting to the user and/or metadata related to visualization. Also, a rule set for determining the occurrence of a problem and various setting values related to the rule set may be entered.

Enterprise or Government Affairs Network and NMCF, NMSF

In the following embodiments, a network monitoring apparatus refers to an NMSF when the NMSF is applied to a network configuration specialized for an enterprise or government affairs network, which may perform the same function as the above-described NMSF though they are different terms. Also, a user terminal may include an NMCF. In addition, an enterprise business network or a government affairs network may be implemented as the above-described 5G NPN.

Figure 18:
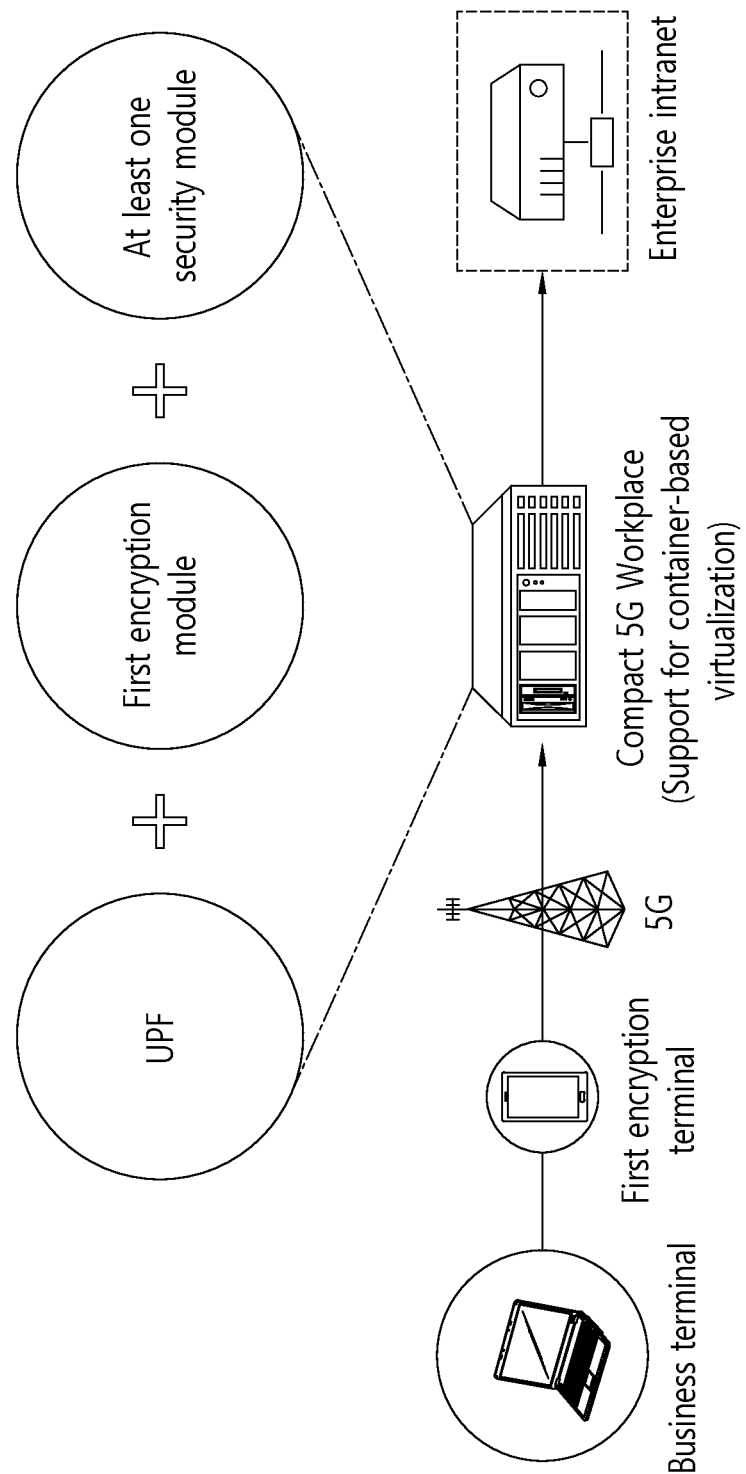
FIG. 18 is a conceptual diagram of an integrated communication apparatus according to an embodiment of the present disclosure.

FIG. 18 is a conceptual diagram of an integrated communication apparatus according to an embodiment of the present disclosure.

Referring to FIG. 18, when a business terminal (also referred to as UE (user equipment)) within an enterprise or government organization is connected to a 5G network, it may be connected to an enterprise intranet via a 5G integrated communication apparatus. The UE may be called an RU (radio unit) and/or a DU (data unit). Here, the 5G integrated communication apparatus includes user plane function(UPF)-related equipment, a first encryption module (also referred to as encryption equipment or gateway), and a 5G communication chip-based intelligent security apparatus.

Here, the UPF function may be formed as a piece of software (SW) on a communication apparatus such as a gateway, which may include a function of digitalizing a radio signal. According to an embodiment of the present disclosure, a piece of hardware equipment may be equipped with the first encryption module and at least one security module, as well as the UPF function, which makes it cost-efficient.

The first encryption module is a communication apparatus (gateway) that provides secure connectivity via a fixed IP to a secondary terminal (UE) connected to a 5G and/or LTE terminal. It may involve using a dedicated network disconnected from the Internet. Accordingly, it may be equipment used by a particular enterprise and/or organization (e.g., government organization), that is used for strengthen strengthening security when accessing a 5G network from a UE related to the enterprise and/or organization. Alternatively, it may be equipment used when the UE attempts to access a particular enterprise and/or organization intranet.

As described above, the first encryption module is equipment for strengthening the security of a 5G network, and may be encryption equipment. Also, a segment from the UE (or first encryption terminal) to the first encryption module may be an encrypted segment. Thus, it may be difficult to monitor data or packets in that segment without a specialized system.

Also, the UE may access the 5G network by using the first encryption terminal operating in conjunction with the first encryption module. The first encryption module and the first encryption terminal may be tunneled. The first encryption terminal may be implemented as a portable WiFi hotspot such as a 5G egg. However, the first encryption terminal is not necessarily required, and the 5G network may be accessed through a 5G base station without the first encryption terminal.

Meanwhile, the 5G as used herein includes millimeter waves.

Figure 19:
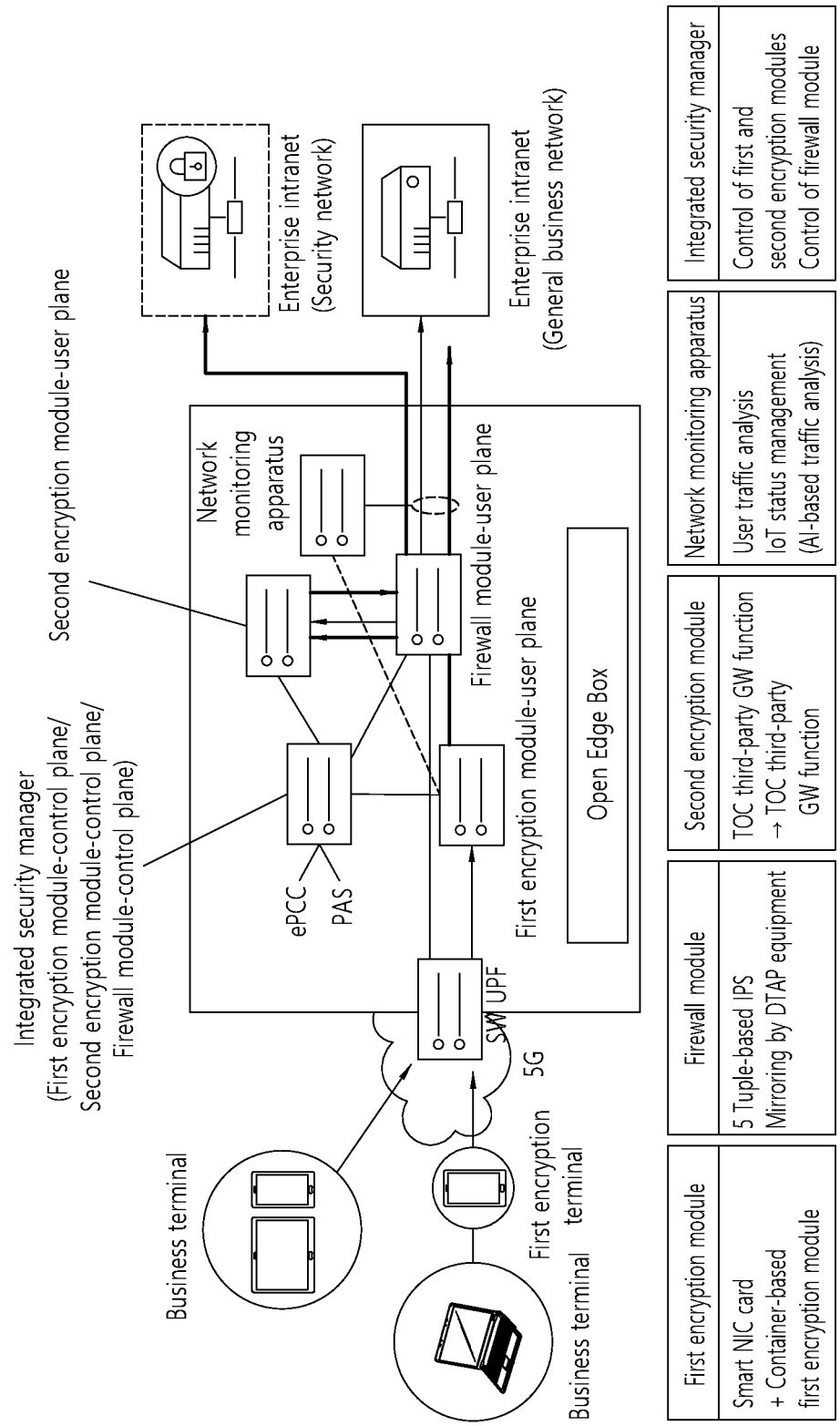
FIG. 19 is a block diagram for explaining functions for each node including an integrated communication apparatus according to an embodiment of the present disclosure.

FIG. 19 is a block diagram for explaining functions for each node including an integrated communication apparatus according to an embodiment of the present disclosure.

Referring to FIG. 19, a user terminal may access a 5G core network through a first encryption terminal or directly through a 5G base station. In this case, once it has entered the 5G network through the 5G base station, data (or packets) from the user terminal pass through a UPF segment, and is delivered to an enterprise intranet (security business network and/or a general business network) via a first encryption-user plane device and a firewall module. As described above, the UPF may be implemented as software, and generates a digital packet and provides it to the first encryption module.

In a larger category, a segment from the user terminal to the 5G base station may be referred to as a radio segment, and a segment from the UPF to the network monitoring apparatus may be referred to as a UPF segment. The above UPF segment also may be called an IP segment because data is handled with an IP assigned to it. A segment after the network monitoring apparatus may be referred to as an MEC (multi-access edge computing) end.

First, the first encryption module may perform encryption based on IP-SEC (Internet Protocol Security) which is a protocol that provides data demodulation and hiding functions in IP packets. The first encryption module will be described in more detail with reference to FIGS. 21 and 22.

Figure 20:
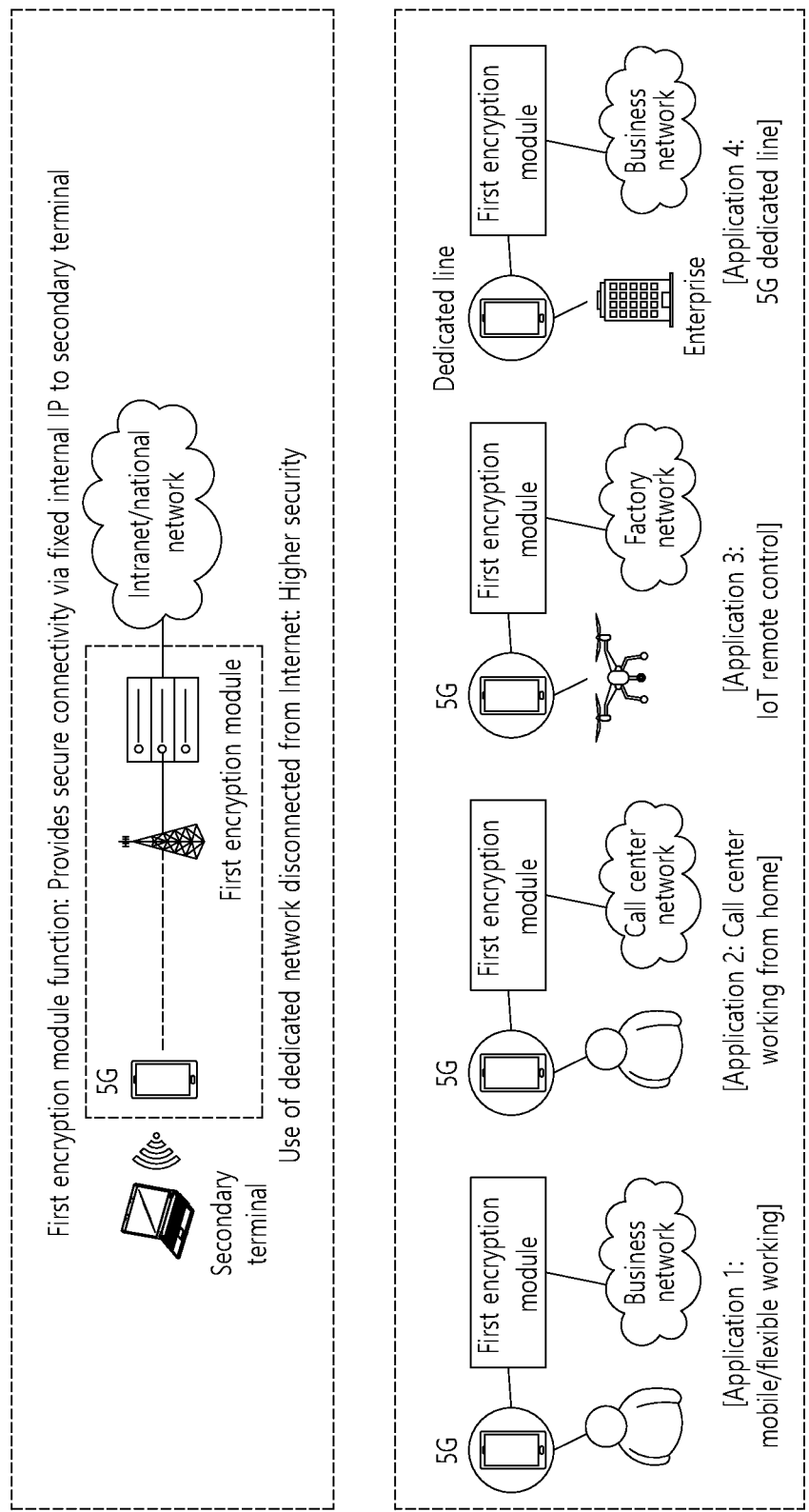
FIG. 20 is a conceptual diagram for explaining a first encryption technique.

FIG. 20 is a conceptual diagram for explaining a first encryption technique.

Referring to the upper image of FIG. 20, the first encryption module provides secure connectivity to the secondary terminal via an internal fixed IP. It includes using a dedicated network disconnected from the Internet. This can strengthen security.

Referring to the lower image of FIG. 20, the first encryption module may be used to interface with a mobile terminal. Also, it may be used to interface with business terminals at homes, and may be used to remotely control IoT devices in such environments as a smart factory. Also, it may be used to strengthen security in an environment where an enterprise's wired network and a 5G dedicated line (wireless network) coexist.

Figure 21:
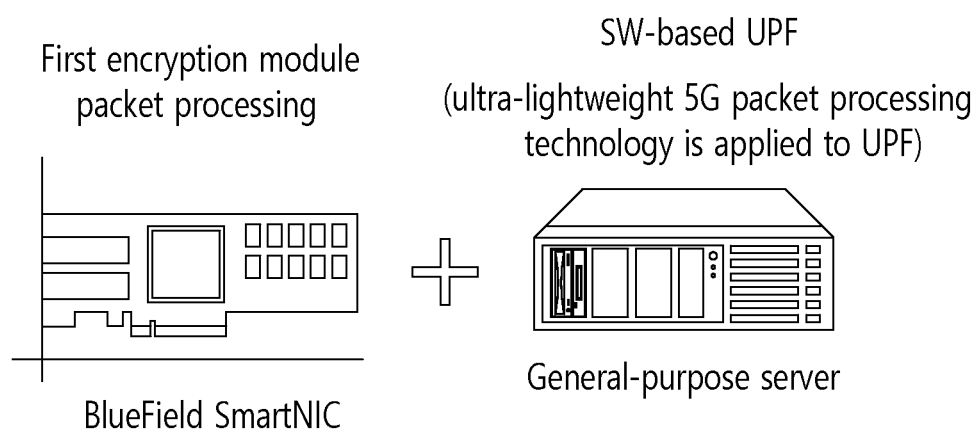
FIG. 21 is a conceptual diagram for explaining what is related to virtualization of first encryption equipment.

FIG. 21 is a conceptual diagram for explaining what is related to virtualization of first encryption equipment.

Referring to FIG. 21, the first encryption module is a device that processes 5G data packets, and may be implemented through container-based virtualization. To this end, it may be implemented in the form of SmartNIC (smart network interface card). SmartNIC is a device where a core processor, a memory module, and a hardware-driven NPU (network processor unit) are mounted together, and it alone may process large-volume work data traffic without using resources of a host server. The first encryption module may be implemented as being integrated with a software-based UPF module (implemented on a general-purpose server). By this, an ultra-lightweight 5G packet processing technology may be applied to UPF as well.

In particular, in terms of cost reduction, the 5G packet processing function may be made into a single integrated device through the SmartNIC technology. Also, in terms of equipment expansion, a 5G core may be scaled out by mounting Smart NIC on a general-purpose server.

Referring back to FIG. 19, the first encryption module is tunneled with the first encryption terminal, and the first encryption terminal substantially encrypts all packets coming from the user terminal based on IP SEC. Since it operates in the form of VPN, all packets can be encrypted.

Once the first encryption module has received an encrypted packet, the first encryption module makes an inquiry to a first encryption module-control plane about the received packet, whether the user is registered with the first encryption module. The first encryption module-control plane determines whether the user is a registered user, and sends a reply to the first encryption module. The first encryption module-control plane may be configured by an enterprise's or organization's network administrator, where an authorized user may be designated. To facilitate user authentication, basically, such an encrypted packet handling procedure may require user login. Accordingly, non-logged in packets are basically dropped. Once the first encryption module has confirmed that the received packet is a packet from a registered user (logged-in user), as a result of inquiring the first encryption module-control plane, it decodes the packet and deliver it to a back end. Data indicated by a thick line may refer to a decoded packet.

Meanwhile, data from a business terminal at an upper end which transmits data directly to the UPF without via the first encryption terminal is provided directly to a firewall module-user plane without passing through the first encryption module, since there is no first encryption module that operates in conjunction with the first encryption module. In this case, a terminal with a client module installed therein in relation to a second encryption module provides data to the second encryption module, and after passing through the second encryption module, the data is delivered to a security business network. Data from a terminal with no client module installed therein in relation to the second encryption module may delivered to a general business network alone, without passing through the second encryption module.

Meanwhile, the second encryption module is a section encryption device for reliable security connection based on multiple security channels. Basic functions of second encryption equipment will be described in more detail with reference to FIGS. 22 and 23.

Figure 22:
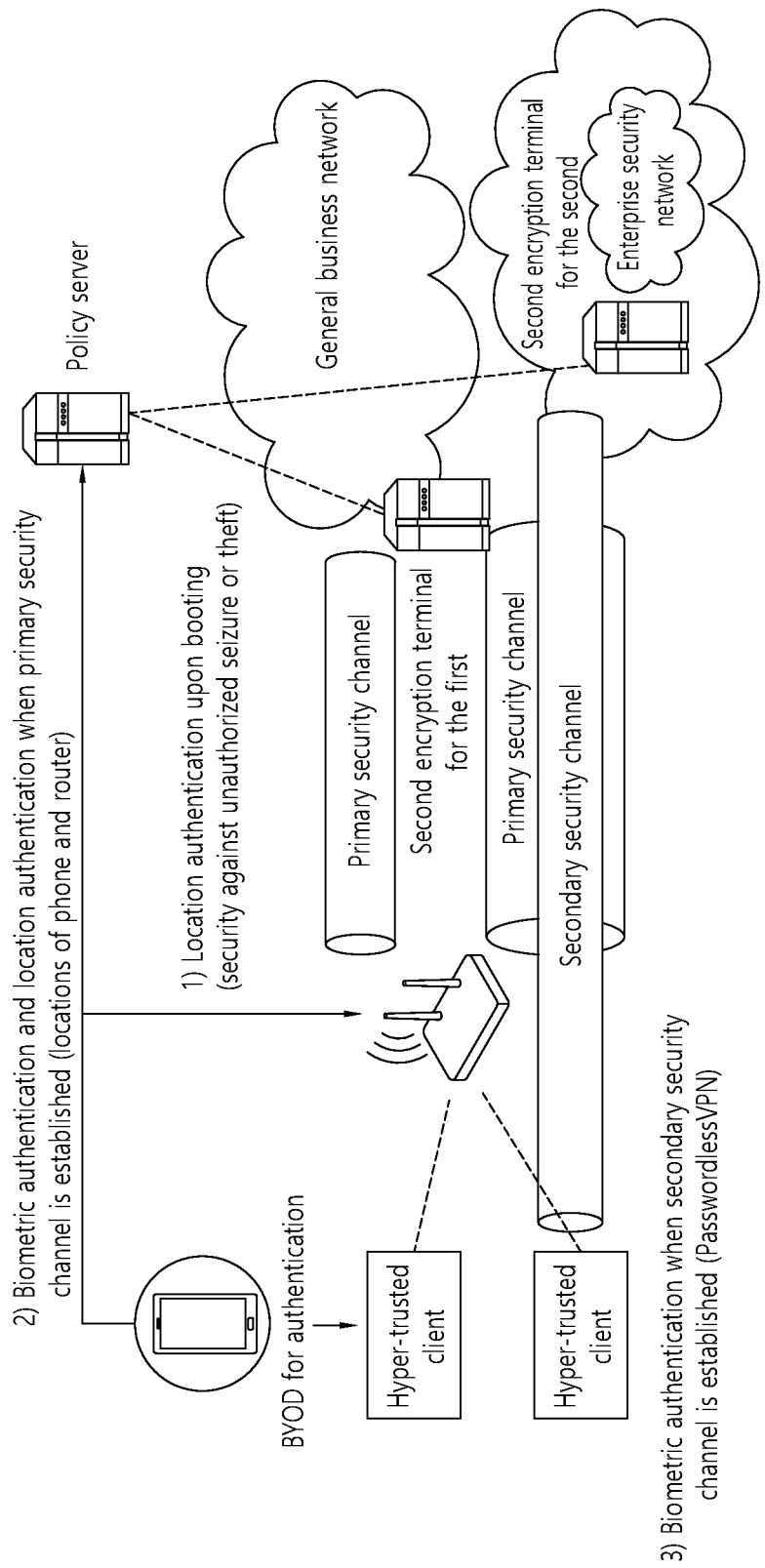
FIG. 22 is a conceptual diagram for explaining a second encryption function.

FIG. 22 is a conceptual diagram for explaining a second encryption function.

Referring to FIG. 22, the second encryption module is a device for forming a security connection network based on multiple security channels. A plurality of second encryption modules may be installed. That is, a primary security channel may be formed primarily through the second encryption module, and a secondary security channel maybe formed secondarily through the second encryption module. The primary security channel may permit a connection to a general business network alone, and data that has passed through the secondary security channel may be connected to a secondary enterprise security network with enhanced security.

In particular, the second encryption module may require installing a module in relation to the second encryption module within a client terminal, for interfacing between the client terminal and the second encryption module. This may include BYOD (Bring Your Own Device) for authentication.

When using the second encryption module, security against unauthorized seizure or theft may be strengthened primarily by location authentication upon booting. Also, biometric authentication and location authentication may be performed when a primary security channel is established. This is done through location authentication of a phone and a router. Equipment authentication and location authentication are possible using a 5G router. Terminal authentication, user authentication, location authentication, and biometric authentication are possible through a work PC connection. Additionally, user authentication may be strengthened through biometric authentication when a secondary security channel is established. This may be implemented through passwordless VPN using biometric authentication of BYOD.

Figure 23:
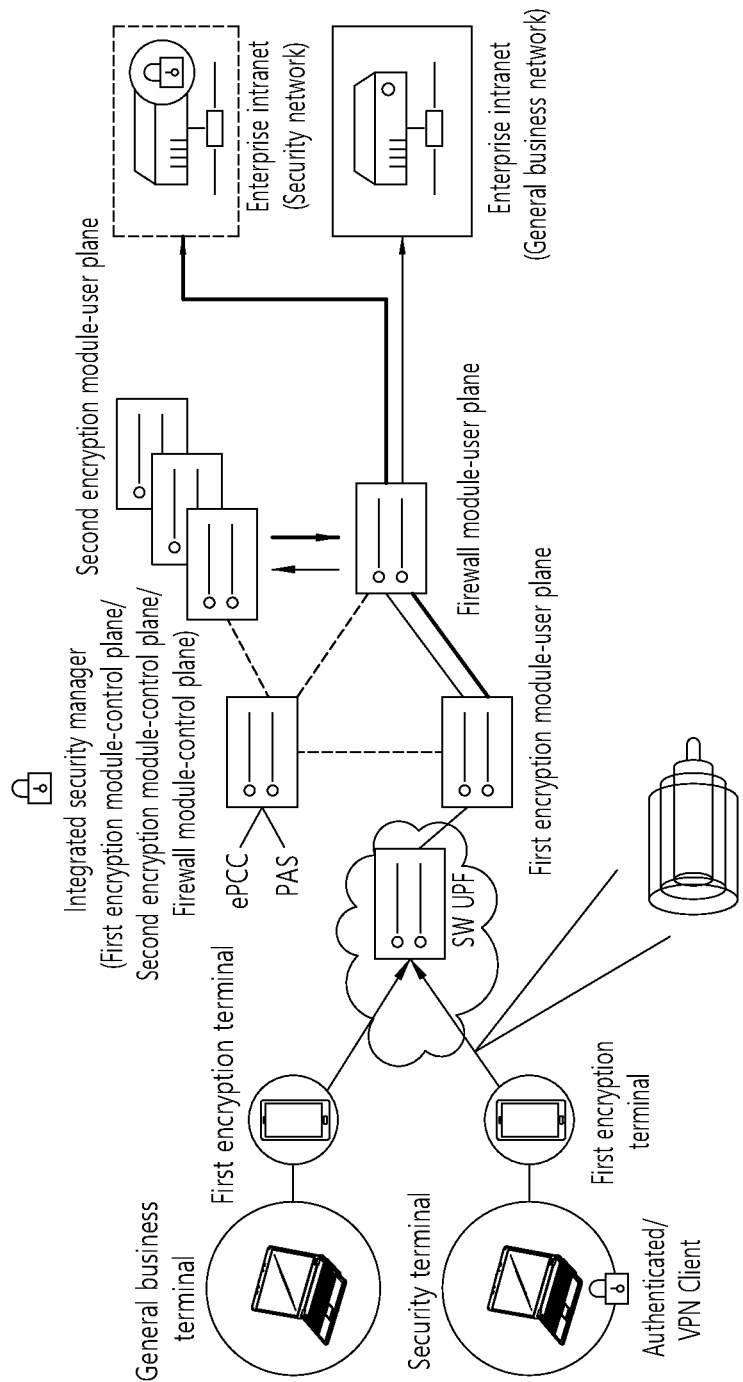
FIG. 23 is a conceptual diagram for explaining a second encryption module capable of creating multiple security channels and authenticating various factors, that operates in conjunction with a first encryption module.

FIG. 23 is a conceptual diagram for explaining a second encryption module capable of creating multiple security channels and authenticating various factors, that operates in conjunction with a first encryption module.

Referring to FIG. 23, the second encryption module encrypts a segment from a user terminal to the second encryption module. To this end, the user terminal preferably includes a client module (VPN client) dedicated to the second encryption module that interfaces with second encryption equipment. It may be a module for user authentication. Only packets from such a client module dedicated to the second encryption module are forwarded to the second encryption module from a firewall module. Then, the forwarded data is decrypted and delivered back to the firewall.

Referring to FIG. 23, only data from a security terminal is delivered to the second encryption module, and data from a general business terminal is provided directly to an enterprise intranet (general business network) without passing through the second encryption module. Meanwhile, explained in FIG. 23, a plurality of second encryption modules may overlap and create double or triple security channels. That is, there may be a plurality of second encryption module-user planes within a single enterprise, and security may be strengthened through path diversification.

According to an embodiment of the present disclosure, encryption through the first encryption module and encryption through the second encryption module may be performed, thereby achieving double encryption. That is, a multi-security network may be constructed by creating double channels. A data flow indicated by a thick line represents data handled through the second encryption module. Since double security is applied to data that has passed through the firewall module, this data may have stronger security. Accordingly, only data with strong security is provided to a security network which requires higher security, and data with no dual security cannot enter the network. Such data only goes to a general business network. Meanwhile, the second encryption module may use SSL VPL for section encryption.

Meanwhile, the second encryption module-user plane is able to handle both authentication and data, and the authentication is preferably handled through the second encryption module-control plane. Also, an integrated security manager may set a policy about whether to interface each module directly with the firewall module or have it pass through the second encryption module-user plane. This may be done by matching with IP information of a corresponding session from the first encryption module-control plane.

Referring back to FIG. 19, the firewall module represents a node that determines whether to block or permit user traffic for every 5 tuples, and can change a path. It may be in-line equipment. The firewall module will be described in more detail with reference to FIG. 24.

Figure 24:
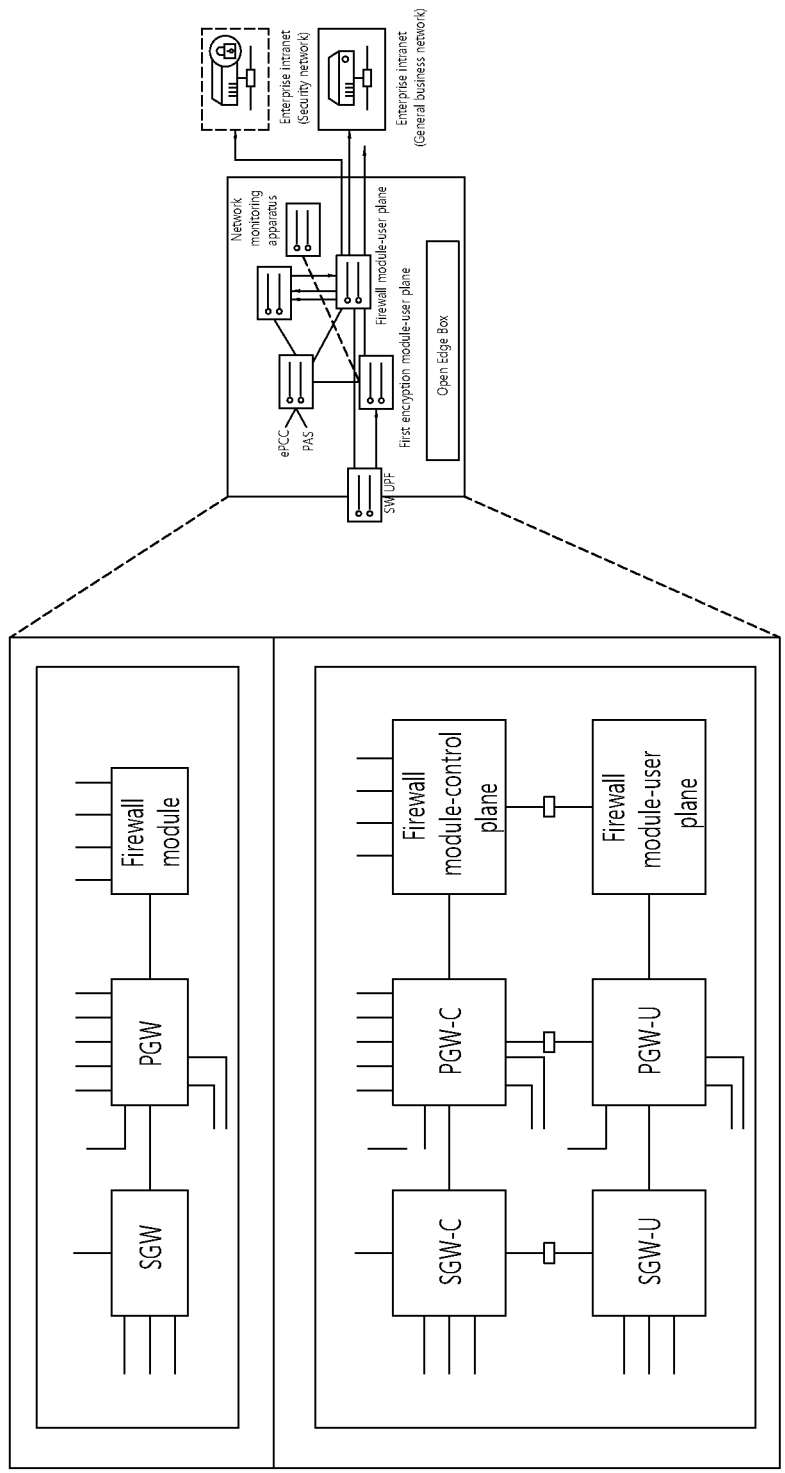
FIG. 24 is a conceptual diagram for explaining functions of a firewall module in detail.

FIG. 24 is a conceptual diagram for explaining functions of a firewall module in detail.

Referring to FIG. 24, basically, the firewall module may perform similar functions to a general firewall. It provides a 5 tuple-based network disconnection function for a particular subscriber. It operates in conjunction with a firewall module-control plane. The firewall module has a packet forwarding function, and therefore may forward a packet to the second encryption module. To this end, all traffic paths for a user who needs to be additionally authenticated may be changed to the second encryption module.

More specifically, the firewall module may inform a PCRF of the initiation/completion of a service to be identified for every subscriber, and the PCRF may designate a particular subscriber and ask the firewall module to notify about the start/completion of a service to be identified. By this, the firewall module may perform redirection, limitation, and charging report for an identified service.

A 3GPP firewall module may be seen as an external separation of a DPI-based traffic processing and charging function which is originally within a PGW. A firewall module according to an embodiment of the present disclosure may be seen as being implemented as a firewall module-control plane and a firewall module-user plane, with its security function strengthened by adding additional user authentication and network access control for each application. That is, this allows for providing a function specialized for enterprise use.

Referring back to FIG. 19, the integrated security manager is a manager that has a function of integrating and controlling the first encryption module, the second encryption module, and the firewall module. That is, the integrated security manager includes a first encryption module-control plane, a second encryption module-control plane and a firewall module-control plane which control the first encryption module, the second encryption module and the firewall module, respectively. This will be described in more detail with reference to FIG. 25.

Figure 25:
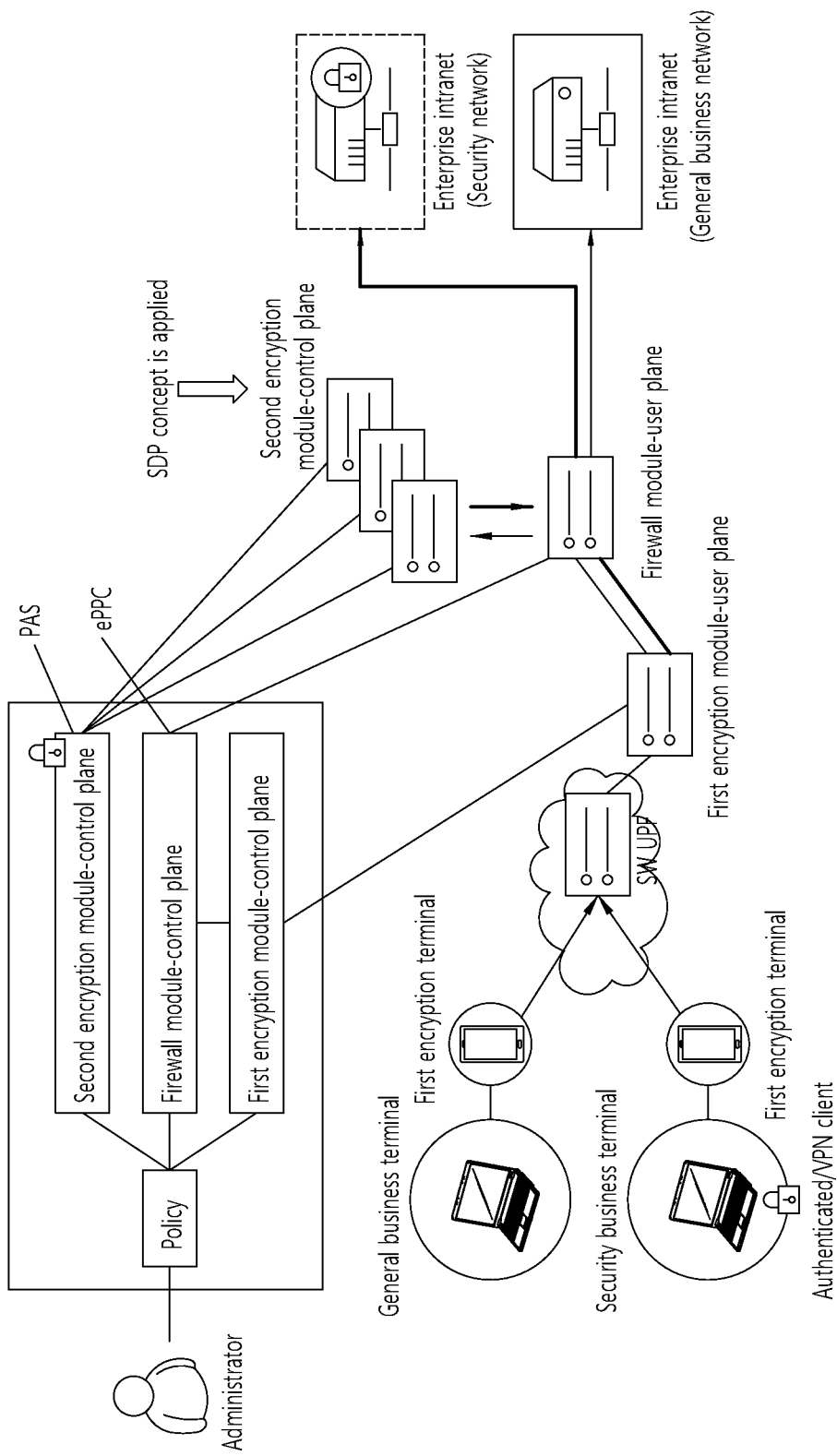
FIG. 25 is a conceptual diagram for explaining functions of an integrated security manager in detail.

FIG. 25 is a conceptual diagram for explaining functions of an integrated security manager in detail.

Referring to FIG. 25, the integrated security manager is a device that combines control parts of the first encryption module, the second encryption module, and the firewall module together and controls and authenticate the security equipment in an integrated manner. This may be achieved through container-based virtualization of the first encryption module-control plane module and the second encryption module-control plane module. Additionally, a firewall module-control plane function capable of 5 tuple-based traffic control (limitation/path change) also may be integrated as a single piece of equipment by container-based virtualization.

The second encryption module-control plane module within the integrated security manager may perform user authentication by interfacing with a VPN client of the security terminal, and, based on this, controls the second encryption module-user plane. In particular, a second encryption module-user plane multi-path control for applying the concept of SDP (software defined perimeter) is possible. This involves a concept of allocating an access gateway after pre-authentication. Recently, more and more SMB companies are using SSL-VPN. Issues with the performance of VPN equipment may arise depending on the size of the company, and there may be a lot of problems due to the manager's policy management and the increased security weakness. SDPs may be an alternative to this. An SDP is a framework that controls access to resources based on identity. It is a concept that involves checking UIDs of a large number of users and allowing them to use service only when their terminals are authenticated. The increases in the numbers of users of IoT, cloud solutions, and mobiles require a security concept fit for open cloud systems rather than a traditional security concept for existing on-premise environments, and the SDP framework may be fit for this.

Figure 26:
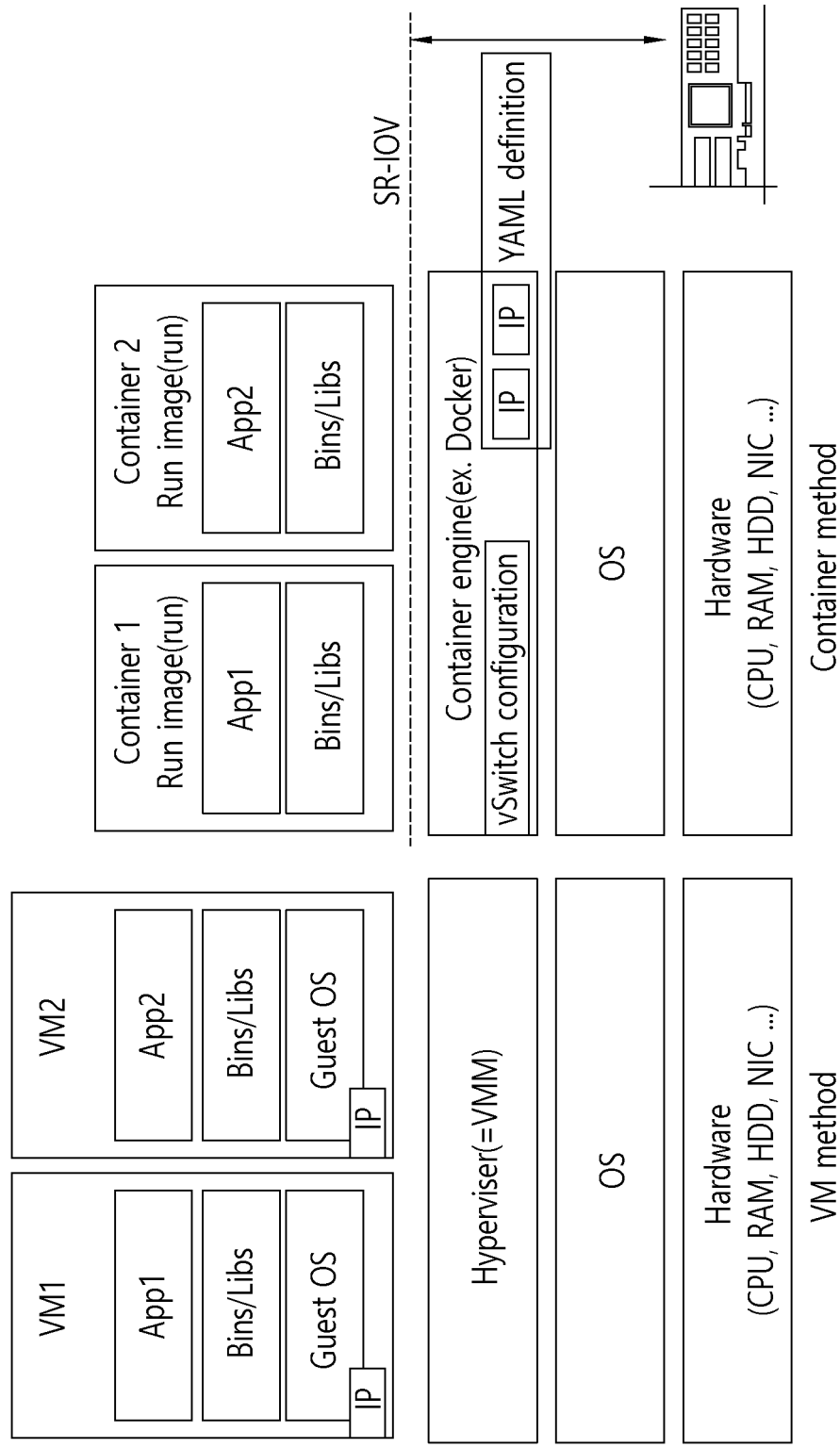
FIG. 26 is a conceptual diagram for explaining container-based virtualization.

FIG. 26 is a conceptual diagram for explaining container-based virtualization.

Referring to FIG. 26, the first encryption module, the second encryption module, and the firewall module control part are capable of container-based virtualization. This can be accomplished by optimizing virtual machine (VM) and Dedi server-based virtualization in such a way as to be distributed in the form of a container image. Also, a dynamic network configuration/management function may be handled at the time of container image deployment. This allows for defining and linking YAML files. Also, compatibility with MEC infrastructures may be achieved. Moreover, a physical NIC may be virtualized using SR-IOV (single root input/output virtualization), thereby allocating this virtualized NIC to a POD. SR-IOV is a standard technology that allows multiple virtual machines to share a single I/O PCI Express hardware interface. Using SR-IOV, a virtual machine may be made look as if it is connected directly to a PCI device, and accordingly performance degradation caused by virtualization may be prevented. In order for a virtual machine to use a host device, it has to use a driver that supports virtualization environments, but SR-IOV uses the existing driver since it directly accesses the device.

Referring back to FIG. 19, the network monitoring apparatus may interface with the first encryption module, perform packet monitoring, analyze monitoring results, and calculate network performance indicators. Also, it is an apparatus that performs security monitoring as well by detecting abnormal situations from the performance indicators. The network monitoring apparatus performs functions such as real time monitoring, corresponding real-time analysis, reporting of analysis results, and issuing of real time alerts.

Upon detecting a performance or security-related risk, the network monitoring apparatus does not only report the security risk situation, but also may instruct the integrated security manager to take active actions such as disconnecting from the network. More specifically, it may send a network disconnection command to the firewall module-control plane of the integrated security manager to cause the firewall module-user plane to disconnect from the network.

Functions of the network monitoring apparatus will be described in more detail with reference to FIGS. 27 and 28.

Figure 27:
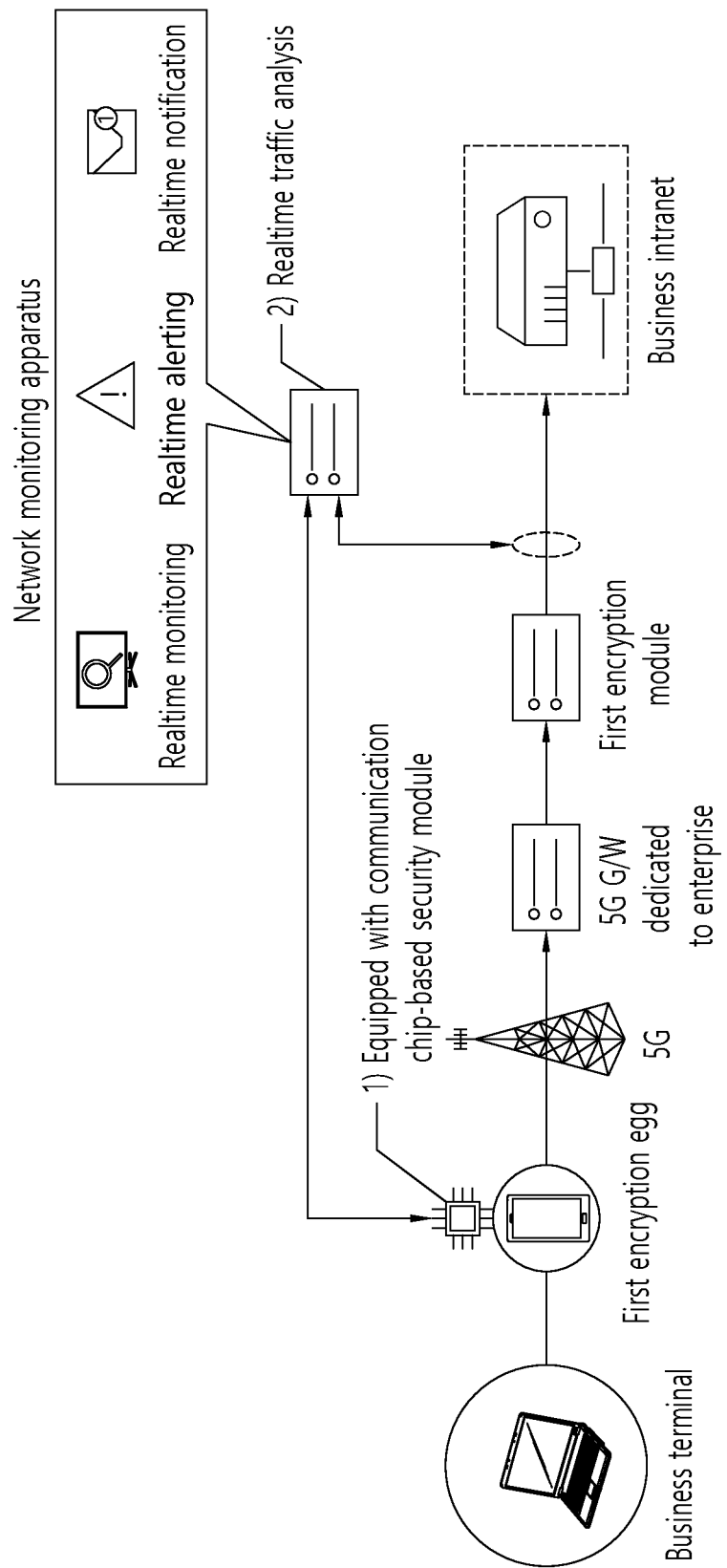
FIG. 27 is a conceptual diagram for explaining functions of a network monitoring apparatus.

FIG. 27 is a conceptual diagram for explaining functions of a network monitoring apparatus.

Referring to FIG. 27, the network monitoring apparatus is an apparatus that detects in advance network failures and network security threats by using a communication chip-based security technology. The network monitoring apparatus performs functions such as detecting hacking, blocking unauthorized terminals, and alerting to and controlling abnormal traffic, by monitoring and analyzing terminal-based traffic. The network monitoring apparatus monitors traffic from the first encryption terminal by interfacing with a security engine (micro engine (ME)) mounted on the first encryption terminal (5G egg). Then, it may perform the security function upon detecting abnormal traffic from this terminal. Also, it may perform E2D failure and security monitoring by interfacing with a real-time traffic analysis system and perform a corresponding control operation.

Figure 28:
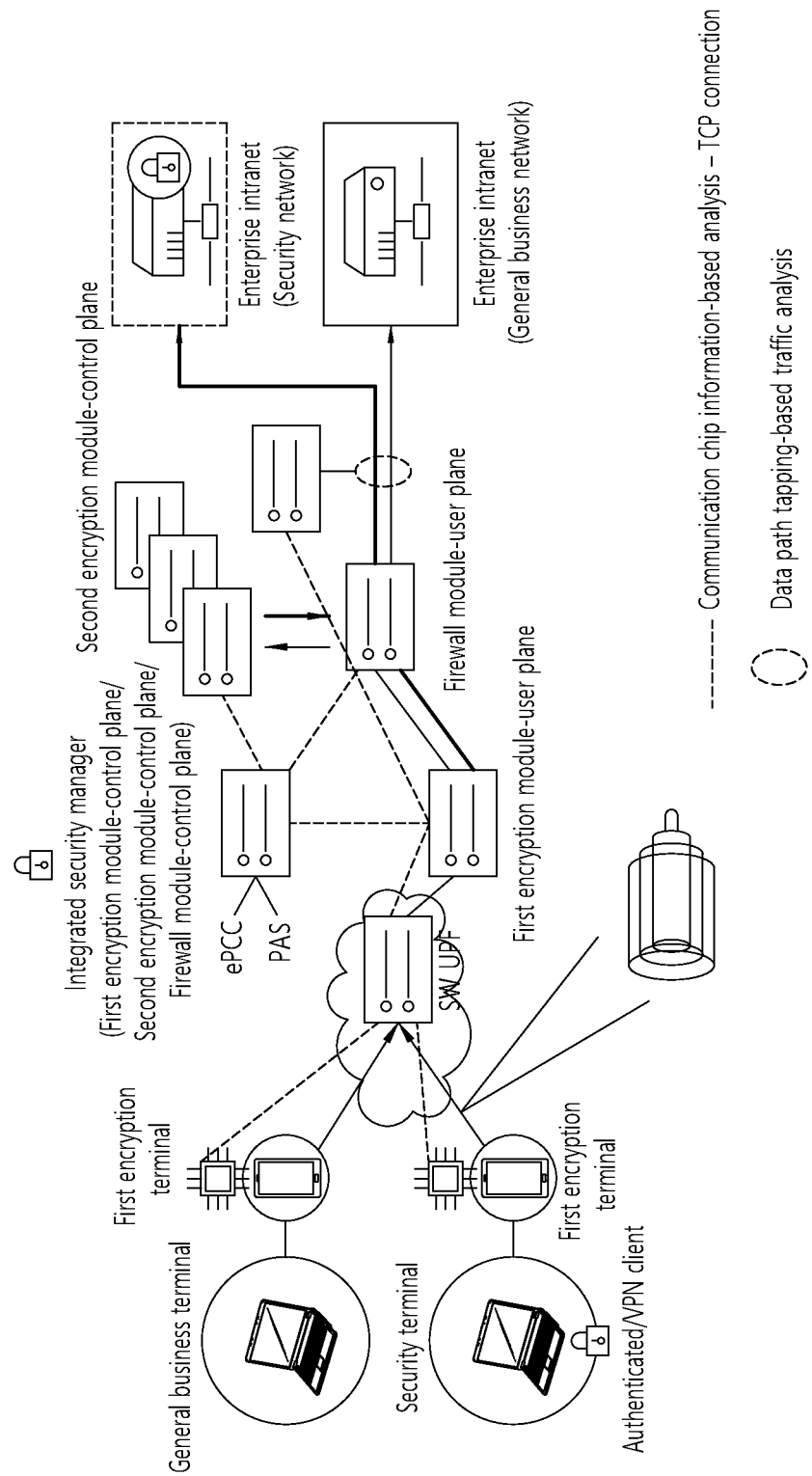
FIG. 28 is a conceptual diagram for explaining in detail a process of traffic analysis through a network monitoring apparatus.

FIG. 28 is a conceptual diagram for explaining in detail a process of traffic analysis through a network monitoring apparatus.

Referring to FIG. 28, a first encryption section is encrypted by a link encryption function with a first encryption terminal and a first encryption module. As explained previously, the first encryption terminal is equipped with a security engine that operates in conjunction with the network monitoring apparatus, so that the security engine is able to provide a packet directly to the network monitoring apparatus without through encryption of the packet. This may allow indirect monitoring of the first encryption section. In other words, packets delivered by the security engine may directly reach the network monitoring apparatus via UPF without passing through the first encryption module-user plane. Although they are illustrated as passing through the first encryption module-user plane in the drawings, this may be understood as being provided directly to the network monitoring apparatus through a switch. This will be described in more detail with reference to FIG. 29.

Figure 29:
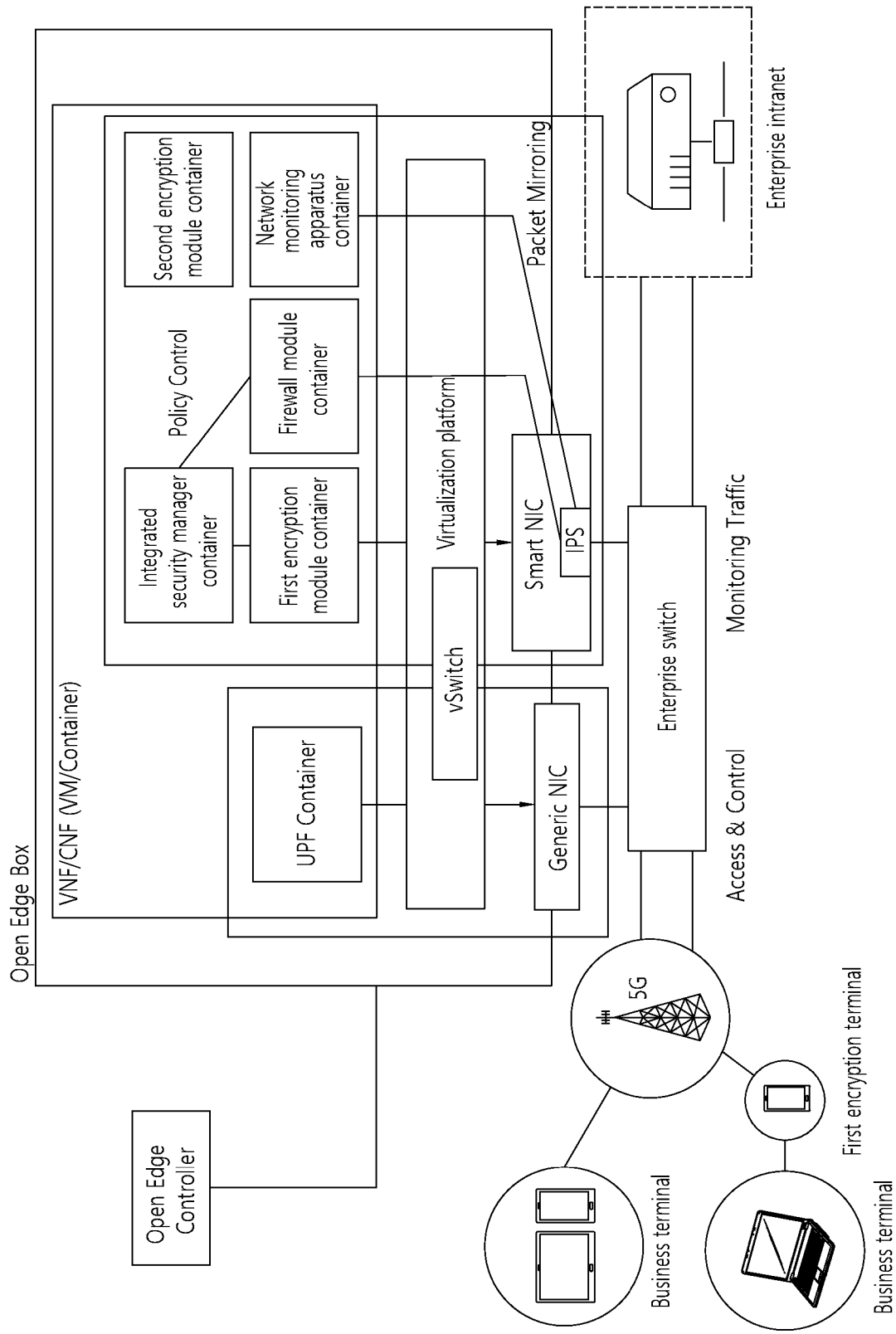
FIG. 29 is a block diagram for explaining a process of delivering data to each of functional blocks within an integrated communication apparatus where a switch is implemented as a single piece of equipment.

FIG. 29 is a block diagram for explaining a process of delivering data to each of functional blocks within an integrated communication apparatus where a switch is implemented as a single piece of equipment.

Referring to FIG. 29, an enterprise switch connected to a 5G base station mirrors and delivers packets by each of virtualization containers within an integrated communication apparatus (also referred to as open edge box). In reality, the enterprise switch delivers data to a Generic NIC and at least one of the above-explained Smart NICs, and packets coming into the Smart NIC may be mirrored and analyzed by the network monitoring apparatus. In this case, the network monitoring apparatus also may see all packets going to the first encryption module-user plane from the first encryption terminal by mirroring them, but these packets are difficult to analyze because they are encrypted. However, packets from a security engine within the first encryption terminal are labeled with specific IPs, so the switch does not have these packets pass through the first encryption module but deliver the mirrored packets to the network monitoring apparatus. On a virtualization platform, a first encryption module, an integrated security manager, a firewall module, the network monitoring apparatus, and a second encryption module container, as well as a UPF container, may be virtualized. Also, the generic NIC may be connected to the UPF, and the first encryption module, the integrated security manager, the firewall module, the network monitoring apparatus, and the second encryption module container may be connected to the Smart NIC. Alternatively, the UPF, the first encryption module, the integrated security manager, the firewall module, the network monitoring apparatus, and the second encryption module container may be connected to at least one of the generic NIC and the Smart NIC. In this case, both NICs may be connected by a virtual switch (vSwitch). By this, the UPF end, the network monitoring apparatus, and the firewall module end may be integrated by a single piece of equipment. Also, the UPF implemented as a VM or a container, the first encryption module, the integrated security manager, the firewall module, the network monitoring apparatus, and the second encryption module container may be controlled by an open edge controller. That is, access control, traffic monitoring, and actions against security threats may be performed according to the control of the open edge controller.

Referring back to FIG. 25, the network monitoring apparatus may allow information from the security engine of a terminal to be collected directly by the network monitoring apparatus by interfacing with the first encryption module-user plane. This is analyzed by the security engine (which may be a module embedded in a communication chip) within the first encryption module, and may be used to check a TCP connection state. Packets delivered by the security engine include health information. This is information for notifying that the equipment is working well, and health checks are done periodically for this information. The network monitoring apparatus may calculate network performance indicators such as RTT (round trip time) based on health information periodically provided from the security engine of the first encryption terminal. This allows for checking the segment from the first encryption terminal to the first encryption module. Additionally, the performance of an air segment may be detected.

Moreover, data at the back end of the firewall module-user plane indicated by a dotted line may be checked through data path tapping-based traffic analysis, so it is possible to calculate performance indicators for different sections and also possible to calculate the performance of the entire section. This allows for checking by section whether a server network is slow or an air network is slow.

Data from a general business terminal with no VPN client operating in conjunction with the second encryption module may enter the UPF end through the first encryption terminal, and be delivered to the general business network without passing through the second encryption module. In this case, the first encryption segment may be monitored through the security engine installed on the first encryption terminal. However, data delivery may not be possible with a security business network that requires stronger security since second encryption module-based encryption is not performed.

According to another embodiment of the present disclosure, the network monitoring apparatus is able to operate without security equipment (the first encryption module, the second encryption module, and the firewall module). Alternatively, only at least one of them may be used. Only the first encryption module may be used, only the second encryption module may be used, only the firewall module may be used, the first encryption module and the second encryption module may be used, the first encryption module and the firewall module may be used, and the second encryption module and the firewall module may be used.

In this case, the network monitoring apparatus may monitor data in front of an MEC, without the above-mentioned security equipment. However, the MEC does not necessarily exist. Data that pas passed through at least one of the above pieces of security equipment may go to the MEC or go directly to a public network without the MEC. In this case, the network monitoring apparatus, located at the back end of the UPF, may monitor all packets entering the UPF by monitoring them.

According to another embodiment of the present disclosure, the first encryption module-user plane may inform the network monitoring apparatus of terminals to be managed in a centralized manner. That is, a particular terminal(s) may be designated so that the network monitoring apparatus is notified of the terminal(s) which are to be managed in a centralized manner in relation to security. As such, the network monitoring apparatus may manage the terminal(s) in a centralized manner, and accordingly may accomplish strengthened monitoring of the designated terminal(s). This may be achieved by receiving information from the first encryption module-user plane in real time.

Additionally, the following embodiment may be considered in relation to unauthorized terminal connection and after-disconnection services.

First, in a case where EAP authentication is omitted so as to accommodate an IoT office device which is hard to authenticate with EAP, a particular first encryption terminal (egg) may need to allow a particular MAC to access without authentication (no user authentication). In this case, if information on the particular MAC is obtained in advance, with this particular first encryption terminal being within a particular region, a certain laptop may freely access the company intranet without authentication by using this particular MAC address by theft on its own network card.

To this end, it is desirable that the following methods be performed in advance. If the first encryption terminal has a particular permissible MAC, "additional user authentication" may be added as a requirement. For example, if the first encryption terminal detects a wired LAN connection, an additional user authentication request is sent to the user/manager number of the first encryption terminal. Then, an IP may be allocated, but the firewall module may block it and then permit traffic after "additional user authentication". In this instance, an intranet access environment may be blocked in advance even if an unauthorized user accesses it, because additional user authentication is necessary.

The following method may be performed afterward rather than in advance. If the first encryption terminal has a particular permissible MAC, it is assigned an IP which is pre-allocated via a corresponding DHCP, and gets permission once MAC authentication is done. An analysis server is present on the server side, and printer/IoT traffic patterns are learned in real time by AI. Upon detecting an unusual attempt (a behavior trying to access by attaching an unauthorized laptop), it may be automatically blocked, and an SMS may be sent to the manager to inquire whether to permit the access or not. For example, a chatbot may be run, and an SMS may be sent to the manager, saying "Abnormal traffic at No. 37, first encryption terminal, has been blocked. If you are going to allow it, send a replay as Yes". When the manager enters "Yes", the traffic of this terminal may be allowed. In this case, the manager's intervention may be minimized through an automatic blocking function, so that the particular first encryption terminal is permitted only as IoT or office equipment.

In the above method to be performed afterward, once the first encryption-control plane's "Automatic disconnection is on upon MAC only authentication and abnormal traffic detection" is configured for the ID of the first encryption terminal, the first encryption module may deliver related information to the network monitoring apparatus so as to monitor mapping IP information of corresponding primary/secondary terminals in a centralized manner.

Then, the network monitoring apparatus starts learning traffic patterns for the corresponding IP (secondary terminal IP).

And, upon detecting abnormal traffic of the secondary terminal due to an intrusion/theft, the network monitoring apparatus may recognize this and send an SMS to the manager to automatically block it.

In this case, in the case of two-way communication, a communication chip-based function allows for sending a particular control command to a terminal, and the network monitoring apparatus may request the primary terminal (egg) to block the IP of the secondary terminal (e.g., a detected intruding PC).

In some cases, if the first encryption module is equipped with a simple firewall module (firewall for the secondary terminal), the network monitoring apparatus may request the first encryption module (firewall module) to block the IP of the secondary terminal. To this end, a connection between the first encryption module-control plane of the integrated security manager and the network monitoring apparatus is required. Alternatively, since the first encryption terminal also is able to know primary/secondary terminal mapping information, a blocking request may be sent to the first encryption module through a connection between the security engine within the first encryption terminal and the network monitoring apparatus.

Figure 30:
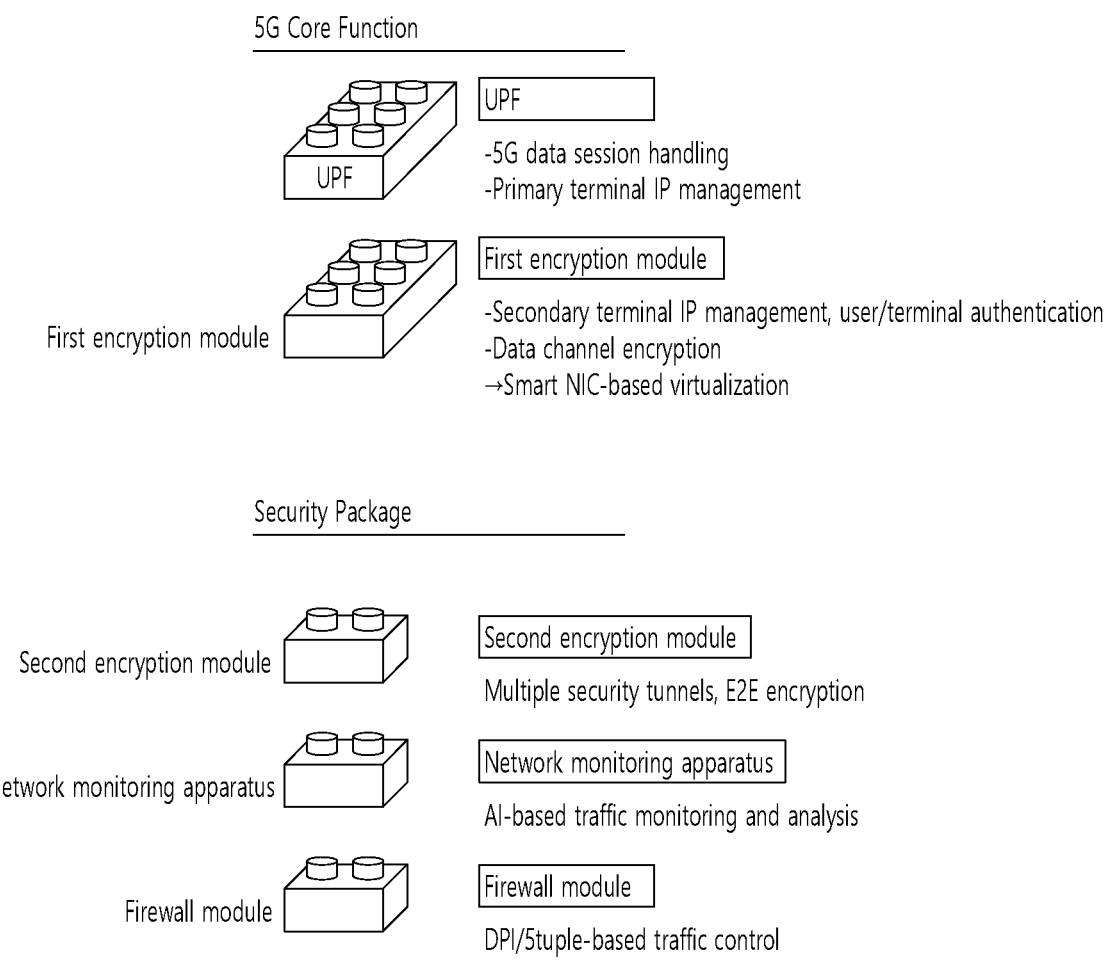
FIGS. 30 and 31 are conceptual diagrams showing various usage examples.
Figure 31:
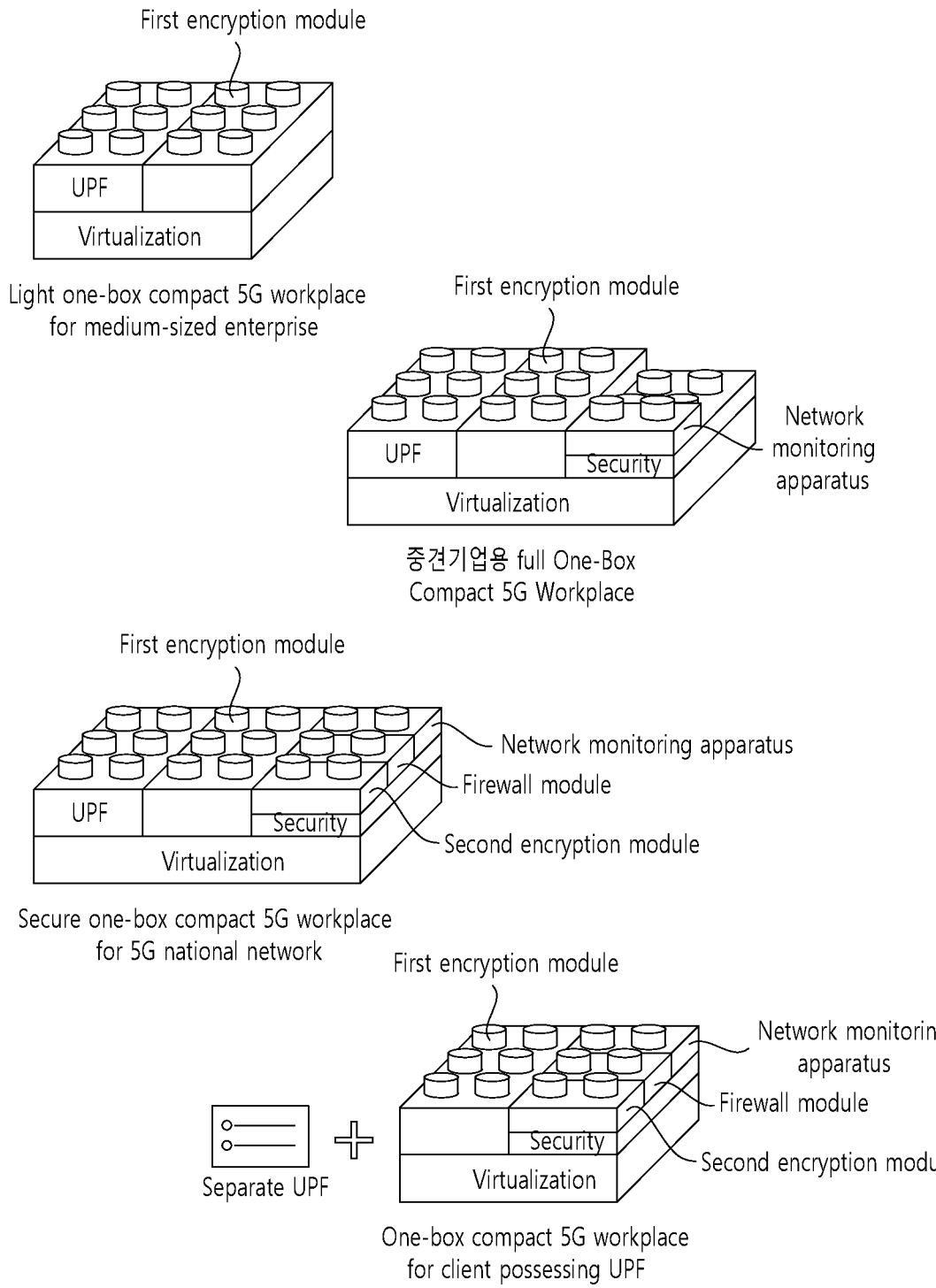

FIGS. 30 and 31 are conceptual diagrams showing various usage examples.

Referring to FIGS. 30 and 31, a 5G integrated communication apparatus may be equipped only with necessary modules that meet a company's needs to deliver services.

First, referring to FIG. 30, each of the modules will be described. In particular, a UPF module and a first encryption module exist for a 5G core function. In this case, the UPF module serve to handle 5G data sessions and manage the IP of a primary terminal, and the first encryption module performs secondary terminal IP management and user/terminal authentication. Moreover, data channel encryption is performed. As described previously, this may be achieved by a first encryption module for Smart NIC-based virtualization.

And, as a security package, there exist a second encryption module for multiple security tunnels and E2E encryption, a network monitoring module for AI-based traffic monitoring and analysis, and a firewall module for DPI/5 tuple-based traffic control.

Referring to FIG. 31, a light version for a medium-sized enterprise may be implemented by only including a UPF module and a first encryption module on a virtualization platform. Next, a full-version integrated communication apparatus for a medium-sized enterprise may be implemented in such a way that a UPF module and a first encryption module are laid on a virtualization platform and a network monitoring module is laid on a security module.

Moreover, security equipment for a 5G national network may be implemented in such a way that a UPF module, a first encryption module, and a security module exist on a virtualization platform, and a second encryption module, a firewall module, and a network monitoring module are laid on the security module.

Furthermore, integrated communication equipment of an enterprise possessing a UPF may be implemented in such a way that a first encryption module and a security module exist on a virtualization platform, and a second encryption module, a firewall module, and a network monitoring module are laid on the security module, with UPF equipment added to it.

The above-described system or apparatus may be implemented as a hardware component, a software component and/or a combination of them. For example, the system, apparatus, and components described in the embodiments may be implemented using one or more general-purpose computers or special-purpose computers, for example, a processor, a controller, an arithmetic logic unit (ALU), a digital signal processor, a microcomputer, a field programmable array (FPA), a programmable logic unit (PLU), a microprocessor or any other device capable of executing or responding to an instruction. The processing apparatus may perform an operating system (OS) and one or more software applications executed on the OS. Furthermore, the processing apparatus may access, store, manipulate, process, and generate data in response to the execution of software. For convenience of understanding, one processing apparatus has been illustrated as being used, but a person having ordinary skill in the art may understand that the processing apparatus may include a plurality of processing elements and/or a plurality of types of processing elements. For example, the processing apparatus may include a plurality of processors or a single processor and a single controller. Furthermore, other processing configurations, such as a parallel processor, are also possible.

Software may include a computer program, code, an instruction or a combination of one or more of them and may configure the processor so that it operates as desired or may instruct the processor independently or collectively. The software and/or data may be embodied in a machine, component, physical device, virtual equipment, computer storage medium or device of any type or a transmitted signal wave permanently or temporarily in order to be interpreted by the processor or to provide an instruction or data to the processor. The software may be distributed to computer systems connected over a network and may be stored or executed in a distributed manner. The software and data may be stored in one or more computer-readable recording media.

The method according to the embodiments may be implemented in the form of a program instruction executable by various computer means and stored in a computer-readable recording medium. The computer-readable recording medium may include a program instruction, a data file, and a data structure solely or in combination. The program instruction recorded on the recording medium may have been specially designed and configured for the embodiment or may have been known to those skilled in the computer software. The computer-readable recording medium includes a hardware device specially configured to store and execute the program instruction, for example, magnetic media such as a hard disk, a floppy disk and a magnetic tape, optical media such as CD-ROM and a DVD, magneto-optical media such as a floptical disk, ROM, RAM, and flash memory. Examples of the program instruction may include high-level language code executable by a computer using an interpreter in addition to machine-language code, such as those generated by a compiler. The hardware devices may be configured to operate as one or more software modules in order to perform the operation of the present disclosure, and vice versa.

While the embodiments have been described above with a few embodiments and the accompanying drawings, one of ordinary skill in the art may make various modifications and changes to the description above. For example, appropriate results can be achieved even if the above-described techniques are performed in a different order from that in the above-described method, and/or the above-described elements such as systems, structures, devices, and circuits are coupled or combined in different forms from those in the above-described method or are replaced or substituted with other elements or their equivalents.

Therefore, other implementations, other embodiments, and equivalents to the claims are also within the scope of the following claims.

What is claimed is:

1. A method of monitoring the security of a 5G non-public (NP) network performed by a network security monitoring server apparatus, the method comprising:
    mirroring and receiving a packet transmitted from a user terminal or to the user terminal through the 5G non-public network;
    receiving a monitoring result of the state of the user terminal from a security monitoring terminal apparatus connected to the user terminal; and
    calculating an indicator related to network performance based on at least one of the mirrored packet and the monitoring result,
    wherein the packet is a packet of which IP encryption is decrypted, the monitoring result is received based on an IP designated for the monitoring server apparatus, and the monitoring server apparatus is located between a user plane function (UPF) relay module of the 5G non-public network and a public network and calculates the indicator related to network performance by mirroring a packet sent or received through the UPF relay module.

2. The method of claim 1, wherein at least one monitoring server apparatus exists within the 5G non-public network, the monitoring server apparatus is connected to at least one of a multi-access edge computing (MEC) module and a switching device that delivers a packet to the public network from the UPF relay module of the 5G non-public network, and the monitoring terminal apparatus is configured to transmit the monitoring result based on either any one IP designated for the at least one monitoring server apparatus, an IP designated for public use by the at least one monitoring server apparatus, or a broadcasting IP for public use the at least one monitoring server apparatus uses to receive a packet.

3. The method of claim 1, wherein a plurality of monitoring server apparatuses exists within the 5G non-public network, and each of the plurality of monitoring server apparatuses is configured to exchange the monitoring result with one another based on the IP designated for each apparatus.

4. The method of claim 1, further comprising, upon discovering an abnormal operation from the indicator related to network performance, sending alerting information to a security controller apparatus by the monitoring server apparatus.

5. The method of claim 1, wherein the monitoring terminal apparatus includes a function of collecting packets of the user terminal and sensing a network security threat related to the user terminal,
    wherein, upon sensing the network security threat, the monitoring terminal apparatus notifies at least either the monitoring server apparatus or the user terminal.

6. The method of claim 1, wherein the monitoring server apparatus is configured to sense a stoppage of operation and incorporate the same into the indicator related to network performance, if the monitoring terminal apparatus stops operating.

7. A network security monitoring system that monitors the security of a 5G non-public (NP) network, the network security monitoring system comprising:
    a packet mirroring apparatus which mirrors a packet transmitted from a user terminal or to the user terminal through the 5G non-public network;
    a security monitoring terminal apparatus which is connected to the user terminal and monitors the state of the user terminal; and
    a network security monitoring server apparatus which receives the monitoring result from the monitoring terminal apparatus, receives the mirrored packet from the packet mirroring apparatus, and calculates an indicator related to network performance based on at least one of the mirrored packet and the monitoring result,
    wherein the packet is a packet of which IP encryption is decrypted, the monitoring result is received based on an IP designated for the monitoring server apparatus, and the packet mirroring apparatus is located between a user plane function (UPF) relay module of the 5G non-public network and a public network and mirrors a packet sent or received through the UPF relay module.

8. The system of claim 7, wherein at least one monitoring server apparatus exists within the 5G non-public network, the monitoring server apparatus is connected to at least one of a multi-access edge computing (MEC) module and a switching device that delivers a packet to the public network from the UPF relay module of the 5G non-public network, and the monitoring terminal apparatus is configured to transmit the monitoring result based on either any one IP designated for the at least one monitoring server apparatus, an IP designated for public use by the at least one monitoring server apparatus, or a broadcasting IP for public use the at least one monitoring server apparatus uses to receive a packet.

9. The system of claim 7, wherein a plurality of monitoring server apparatuses exists within the 5G non-public network, and each of the plurality of monitoring server apparatuses is configured to exchange the monitoring result with one another based on the IP designated for each apparatus.

10. The system of claim 7, further comprising a security controller apparatus, wherein, upon discovering an abnormal operation from the indicator related to network performance, the monitoring server apparatus sends alerting information to a security controller apparatus, and the security controller apparatus performs an operation of stopping the network or restarting the same.

11. The system of claim 7, wherein the monitoring terminal apparatus includes a function of collecting packets of the user terminal and sensing a network security threat related to the user terminal,
    wherein, upon sensing the network security threat, the monitoring terminal apparatus notifies at least one of the monitoring server apparatus or the user terminal.

12. The system of claim 7, wherein the monitoring server apparatus is configured to sense a stoppage of operation and incorporate the same into the indicator related to network performance, if the monitoring terminal apparatus stops operating.

13. A network security monitoring server apparatus that monitors the security of a 5G non-public (NP) network, the network security monitoring server apparatus comprising:

a processor configured to mirror and receive a packet transmitted from a user terminal or to the user terminal through the 5G non-public network, to receive a monitoring result of the state of the user terminal from a security monitoring terminal apparatus connected to the user terminal, and to calculate an indicator related to network performance based on at least one of the mirrored packet and the monitoring result; and a memory storing instructions and programs required for operation of the processor, wherein the packet is a packet of which IP encryption is decrypted, the monitoring result is received based on an IP designated for the monitoring server apparatus, and the mirrored packet is a packet transmitted or received through the UPF relay module, that is mirrored between a user plane function (UPF) relay module of the 5G non-public network and a public network.

14. The network security monitoring server apparatus of claim 13, wherein a plurality of monitoring server apparatuses exists within the 5G non-public network, and each of the plurality of monitoring server apparatuses is configured to exchange the monitoring result with one another based on the IP designated for each apparatus.

15. The network security monitoring server apparatus of claim 13, wherein the monitoring server apparatus is configured to send alerting information to a security controller upon discovering an abnormal operation from the indicator related to network performance.

* * * * *